United States Patent
Nomura et al.

(10) Patent No.: US 12,522,759 B2
(45) Date of Patent: Jan. 13, 2026

(54) LATENT HEAT STORAGE BODY MICROCAPSULE AND METHOD FOR PRODUCING SAME

(71) Applicant: NATIONAL UNIVERSITY CORPORATION HOKKAIDO UNIVERSITY, Hokkaido (JP)

(72) Inventors: Takahiro Nomura, Sapporo (JP); Kohei Kashiyama, Sapporo (JP); Hiroki Sakai, Sapporo (JP); Miki Haga, Sapporo (JP); Shunsuke Cho, Sapporo (JP); Nan Sheng, Sapporo (JP); Takahiro Kawaguchi, Sapporo (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 991 days.

(21) Appl. No.: 17/753,297

(22) PCT Filed: Aug. 27, 2020

(86) PCT No.: PCT/JP2020/032341
§ 371 (c)(1),
(2) Date: Feb. 25, 2022

(87) PCT Pub. No.: WO2021/039899
PCT Pub. Date: Mar. 4, 2021

(65) Prior Publication Data
US 2022/0380650 A1 Dec. 1, 2022

(30) Foreign Application Priority Data
Aug. 27, 2019 (JP) .................. 2019-155019

(51) Int. Cl.
C09K 5/06 (2006.01)
B22F 1/145 (2022.01)
B22F 1/16 (2022.01)

(52) U.S. Cl.
CPC .............. *C09K 5/063* (2013.01); *B22F 1/145* (2022.01); *B22F 1/16* (2022.01); *B22F 2301/30* (2013.01);
(Continued)

(58) Field of Classification Search
CPC ........... C09K 5/06; C09K 5/063; Y02E 60/14; B22F 1/145; B22F 1/16; B22F 2301/30; B22F 2302/25; B22F 2304/10
See application file for complete search history.

(56) References Cited

U.S. PATENT DOCUMENTS

2016/0317992 A1* 11/2016 Thuo .................. B01J 13/04
2016/0339915 A1   11/2016 Kuwahara et al.
(Continued)

FOREIGN PATENT DOCUMENTS

JP  2016-215745 A  12/2016
KR  10-2019-0036278 A  4/2019
(Continued)

OTHER PUBLICATIONS

Tevis et al. ("Synthesis of liquid core-shell particles by solid patchy multicomponent particles by shearing liquids into complex particles (SLICE)", Langmuir 2014, 30, 14308-14313) (Year: 2014).*
(Continued)

*Primary Examiner* — Matthew R Diaz
(74) *Attorney, Agent, or Firm* — Studebaker Brackett PLLC

(57) ABSTRACT

A latent heat storage body microcapsule includes a core including gallium or gallium alloy; and a shell covering the core and including gallium oxide. A method for producing
(Continued)

the same includes a particle-forming step of forming gallium or an alloy of gallium in a liquid state into particles; a water treatment step of heating the particles in distilled water to form a gallium hydrate on a surface of each of the particles; and an oxidation treatment step of oxidizing the gallium hydrate to form a shell including gallium oxide. The method includes a particle-forming step of forming gallium or an alloy of gallium in a liquid state into particles; a cooling step of cooling the particles to a solid state; and a pH treatment step of immersing the particles in an aqueous solution having a predetermined pH to form a shell including gallium hydrate.

6 Claims, 30 Drawing Sheets

(52) U.S. Cl.
CPC ....... *B22F 2302/25* (2013.01); *B22F 2304/10* (2013.01)

(56) References Cited

U.S. PATENT DOCUMENTS

| | | | | |
|---|---|---|---|---|
| 2017/0044415 | A1* | 2/2017 | Akiyama | ................ C09K 5/063 |
| 2017/0218167 | A1* | 8/2017 | Majidi | ..................... H01B 1/22 |
| 2018/0257322 | A1 | 9/2018 | Thuo et al. | |
| 2019/0300770 | A1 | 10/2019 | Nomura et al. | |

FOREIGN PATENT DOCUMENTS

| | | | | |
|---|---|---|---|---|
| WO | 2015/162929 | A1 | 10/2015 | |
| WO | WO-2017011029 | A1 * | 1/2017 | ................ B22F 1/16 |
| WO | 2017/200021 | A1 | 11/2017 | |

OTHER PUBLICATIONS

Cutinho et al. ("Autonomous thermal-oxidative composition inversion and texture tuning of liquid metal surfaces," ACS Nano, 2018, 12, 4744-4753) (Year: 2018).*
Xiang et al. ("Liquid gallium nanospheres emitting white light," Laser Photonics Rev., 2019, 13, 1800214) (Year: 2019).*
International Search Report issued in PCT/JP2020/032341; mailed Nov. 2, 2020.
International Preliminary Report on Patentability (Chapter II) issued in PCT/JP2020/032341; completed Dec. 3, 2021.
An Office Action; "Notice of Reasons for Refusal," mailed by the Japanese Patent Office on Mar. 7, 2023, which corresponds to Japanese Patent Application No. 2021-542998 and is related to U.S. Appl. No. 17/753,297; with English language translation.
S. Catalán-Gómez et al., "Size-selective breaking of the core-shell structure of gallium nanoparticles", Nanotechnology, 29(35):355707, total 19 pages, Aug. 31, 2018, IOP Publishing.
An Office Action issued by China National Intellectual Property Administration, dated Apr. 9, 2024, which corresponds to Chinese Patent Application No. 202080060730.4 and is related to U.S. Appl. No. 17/753,297; with English language translation.
Ian D. Tevis et al.; "Synthesis of Liquid Core-Shell Particles and Solid Patchy Multicomponent Particles by Shearing Liquids Into Complex Particles (SLICE)", Langmuir, vol. 30, No. 47, Nov. 18, 2014, pp. 14308-14313, doi: 10.1021/la5035118.
The extended European search report issued by the European Patent Office on Aug. 11, 2023, which corresponds to European Patent Application No. 20857100.0-1108 and is related to U.S. Appl. No. 17/753,297.

* cited by examiner

LATENT HEAT STORAGE BODY MICROCAPSULE AND METHOD FOR PRODUCING SAME

TECHNICAL FIELD

The present invention relates to a latent heat storage body microcapsule and a method for producing the same, and particularly to a latent heat storage body microcapsule in which a core including gallium or gallium alloy is covered with a shell including gallium oxide or gallium hydroxide, and a method for producing the same.

BACKGROUND ART

In recent years, development of lithium ion batteries has progressed, and power and capacity of batteries have rapidly increased. However, to optimize battery characteristics, prolong life, and further improve safety, advanced thermal management of batteries is required. For example, at the time of charging and discharging the battery, the cell temperature may rise due to heat generation of the battery cell, leading to deterioration of battery performance and thermal runaway. Therefore, it is necessary to maintain the cell temperature at an optimum temperature (about up to 50° C.) at the time of charging and discharging the battery.

In addition, the cruising range of an electric vehicle has been improved, but on the other hand, there is a problem that the cruising range decreases due to power consumption for cooling in the summer period and heating in the winter period. If heat generated in a vehicle can be absorbed via a heat pump and efficiently used for cooling and heating, a decrease in cruising range can be prevented. However, unlike an internal combustion engine vehicle having a large heat source, that is, an engine, an electric vehicle has a small heat generation process and a small heat generation amount, and thus an advanced heat management technology for more effectively collecting heat is required.

On the other hand, there is a possibility that a phase change material (PCM) can be used as a thermal buffer that absorbs heat generated from a lithium ion battery and maintains the inside of the module at a constant temperature. There is also a possibility that heat intermittently generated at a plurality of places can be recovered and used as a heat source at a constant temperature by disposing the PCM at each heat generation place. For this reason, use of a latent heat storage body in which an organic compound such as normal paraffin is wrapped in a metal seamless capsule has been proposed (see, for example, Patent Document 1).

PRIOR ART DOCUMENT

Patent Document

Patent Document 1: JP 2016-215745 A

SUMMARY OF THE INVENTION

Problems to be Solved by the Invention

However, the thermal conductivity of PCM is usually low, and for example, the above-described latent heat storage body has a very low thermal conductivity of about 0.21 W/m·K, and there is a problem that heat cannot be absorbed quickly. In addition, because the space in which the heat storage material can be disposed inside an electric vehicle is extremely limited, it is necessary to develop a latent heat storage body whose shape can be flexibly changed.

Therefore, an object of the present invention is to provide a latent heat storage body microcapsule that has higher thermal conductivity than conventional PCMs and whose shape can be flexibly changed, and a method for producing the latent heat storage microcapsule.

Means for Solving the Problems

An aspect of the present invention is a latent heat storage body microcapsule including:
  a core including gallium or gallium alloy; and
  a shell covering the core and including gallium oxide.

Another aspect of the present invention is a latent heat storage body microcapsule including:
  a core including gallium or gallium alloy; and
  a shell covering the core and including gallium hydrate.

Another aspect of the present invention is a method for producing a latent heat storage body microcapsule, the method including:
  a particle-forming step of forming gallium or an alloy of gallium in a liquid state into particles;
  a water treatment step of heating the particles in distilled water to form a gallium hydrate on a surface of each of the particles; and
  an oxidation treatment step of oxidizing the gallium hydrate to form a shell including gallium oxide.

Another aspect of the present invention is a method for producing a latent heat storage body microcapsule, the method including:
  a particle-forming step of forming gallium or an alloy of gallium in a liquid state into particles;
  a cooling step of cooling the particles to a solid state;
  a pH treatment step of immersing the particles in an aqueous solution having a predetermined pH to form a shell including gallium hydrate.

Effects of the Invention

In the latent heat storage body microcapsule according to an aspect of the present invention, it is possible to provide a heat storage material having high thermal conductivity and heat storage density and having a flexible shape.

In addition, in the method for producing a latent heat storage body microcapsule according to an aspect of the present invention, it is possible to provide a latent heat storage body microcapsule having high thermal conductivity and heat storage density and having high thermal durability.

EMBODIMENTS OF THE INVENTION

1. Latent Heat Storage Body Microcapsule

Figure 1:
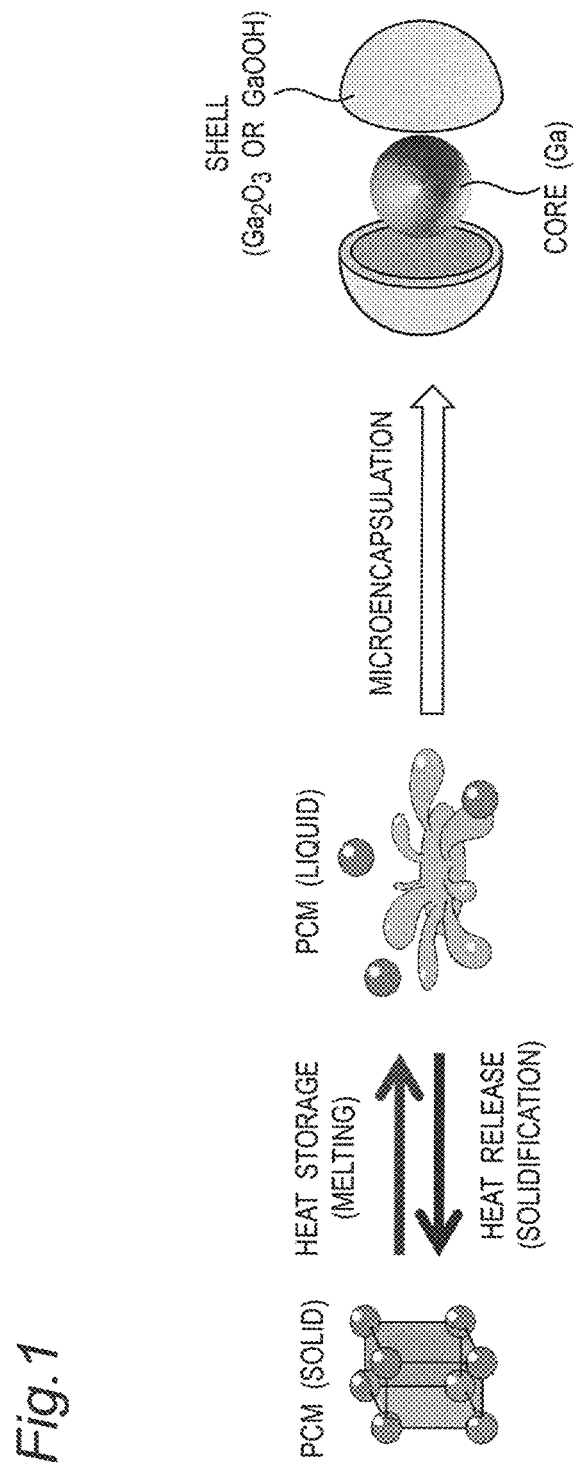
FIG. 1 is a schematic view for explaining a latent heat storage body microcapsule according to an embodiment of the present invention.

FIG. 1 is a schematic view for explaining a latent heat storage body microcapsule (hereinafter, it is also simply referred to as "microcapsule") according to an embodiment of the present invention. In the embodiment of the present invention, gallium which is a phase change material (PCM) is used as a latent heat storage body. Gallium has a melting point of about 29.8° C., and stores heat when melting from a solid to a liquid in the vicinity of the melting point, and releases heat when solidifying from a liquid to a solid.

For this reason, by sealing gallium in a microcapsule that does not melt in a temperature range at which the microcapsule is used as a latent heat storage body, it is possible to always use the latent heat storage body as a solid. In addition, when the diameter of the microcapsule is several tens μm, a heat transfer area increases, and thermal responsiveness improves.

By forming a heat storage material from an aggregate of latent heat storage body microcapsules having a diameter of several tens μm, it is possible to freely change the size and shape of the heat storage material. Therefore, the heat storage material can be disposed inside an electric vehicle or the like with an extremely limited space in which the heat storage material can be disposed.

As shown in the right diagram of FIG. 1, the latent heat storage body microcapsule includes a core including gallium (Ga) and a shell (capsule) including gallium oxide or gallium hydrate ($Ga_2O_3$ or GaOOH).

(1) Gallium/Gallium Oxide Microcapsule

When the core of the latent heat storage body microcapsule includes gallium (Ga) and the shell includes gallium oxide, the gallium oxide ($Ga_2O_3$) includes $\beta$-$Ga_2O_3$ or mixture of $\beta$-$Ga_2O_3$ and $\alpha$-$Ga_2O_3$.

Figure 2:
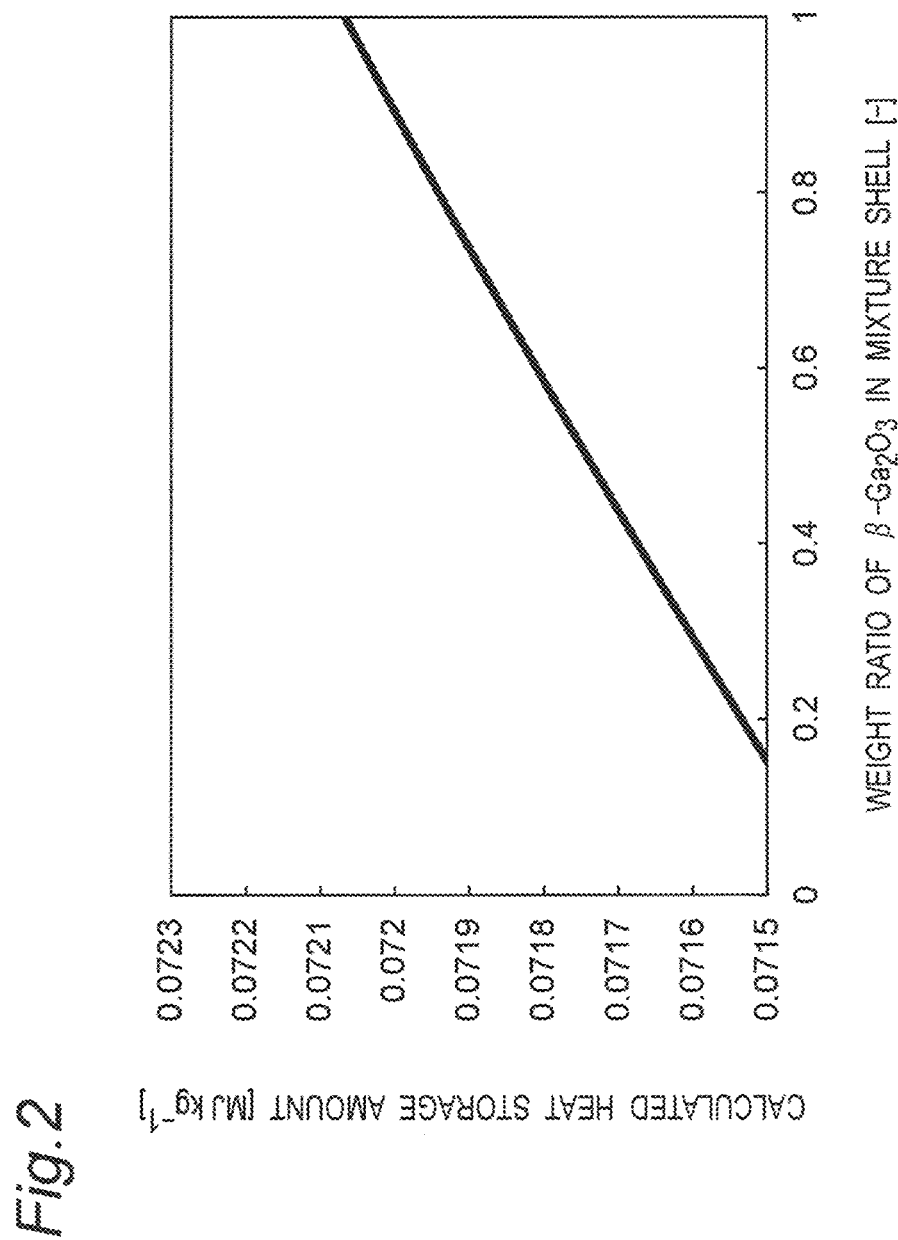
FIG. 2 is a relationship between a weight ratio and a weight-based heat storage amount of $\beta\text{-}Ga_2O_3$ in a mixture shell.

FIG. 2 shows the relationship between the weight ratio of $\beta$-$Ga_2O_3$ to the entire mixture shell (($\beta$-$Ga_2O_3$)/($\alpha$-$Ga_2O_3$+$\beta$-$Ga_2O_3$)) and the weight-based heat storage amount when the volume ratio of the mixture shell to the latent heat storage body microcapsule is 0.1. As can be seen from FIG. 2, as the proportion of $\beta$-$Ga_2O_3$ increases, the weight-based heat storage amount of the microcapsule increases. Therefore, the proportion of $\beta$-$Ga_2O_3$ in the shell is preferably high, and for example, the weight ratio is preferably in the range of 0.7 or more and 1 or less.

In a microcapsule whose shell is all composed of $\beta$-$Ga_2O_3$, when the volume ratio of the shell is 0.1, the heat storage density is about 426 $MJ/m^3$. This is about 2.4 times larger than the heat storage density of the microcapsule in which the core is a paraffin-based organic compound (about 180 $MJ/m^3$) described in Patent Document 1.

The microcapsule is substantially spherical and has a diameter of 20 μm or more and 60 μm or less, preferably 30 μm or more and 40 μm or less. In addition, the film thickness of the shell including gallium oxide is preferably, for example, 0.5 μm or more and 1.0 μm or less. The ratio (r2/r1) between a thickness r2 of the shell and a radius r1 of the microcapsule is preferably 0.025 or more and 0.07 or less.

Forming the microcapsule into a sphere having a diameter of about 20 μm to 60 μm can increase a heat transfer area (surface area of the microcapsule). The thermal conductivity of the core is about 40 W/mK. This is about 200 times larger than the thermal conductivity of the core of the microcapsule in which the core is a paraffin-based organic compound (about 0.21 W/mK) described in Patent Document 1.

The density of the microcapsule is 5910 kg/m$^3$. This is about six times larger than the density of the microcapsule in which the core is a paraffin-based organic compound (about 900 kg/m$^3$) described in Patent Document 1.

In the microcapsule according to the embodiment of the present invention, the volume of the space inside the shell is formed to be equal to or larger than the volume of gallium in a state where gallium is solid at a temperature equal to or lower than the melting point. This can form a highly reliable microcapsule whose core does not become damaged even if the volume of gallium increases due to phase transformation when the microcapsule is used for heat storage.

The metal of the core may be a gallium alloy such as Ga—In, Ga—Sn, or Ga—Zn instead of pure gallium. The melting point of the core can be changed by adding In, Sn, Zn, or the like.

In addition, in the microcapsule, a region containing both Ga or a Ga alloy and $Ga_2O_3$ may be included at a boundary between a core including gallium or gallium alloy and a shell including gallium oxide.

(2) Gallium/Gallium Hydrate Microcapsule

When the core of the latent heat storage body microcapsule includes gallium (Ga) and the shell includes gallium hydrate, the gallium hydrate includes, for example, GaOOH.

The microcapsule is substantially spherical and has a diameter of 20 μm or more and 60 μm or less, preferably 30 μm or more and 40 μm or less. The film thickness of the shell including gallium hydrate is preferably, for example, 0.5 μm or more and 1.0 μm or less. The ratio (r2/r1) between a thickness r2 of the shell and a radius r1 of the microcapsule is preferably 0.025 or more and 0.07 or less.

In the microcapsule according to the embodiment of the present invention, the volume of the space inside the shell is formed to be equal to or larger than the volume of gallium in a state where gallium is solid at a temperature equal to or lower than the melting point. This can form a highly reliable microcapsule whose core does not become damaged even if the volume of gallium increases due to phase transformation when the microcapsule is used for heat storage.

The metal of the core may be a gallium alloy such as Ga—In, Ga—Sn, or Ga—Zn instead of pure gallium. The melting point of the core can be changed by adding In, Sn, Zn, or the like.

In addition, in the microcapsule, a region containing both Ga or a Ga alloy and $Ga_2O_3$ may be included at a boundary between a core including gallium or gallium alloy and a shell including gallium oxide.

2. Method for Producing Latent Heat Storage Body Microcapsule

Gallium expands by 3.2% in volume as it solidifies from a liquid to a solid. For this reason, in the microcapsule in which liquid gallium is covered with a solid shell, there is a problem that the volume of gallium expands when gallium solidifies and the microcapsule becomes damaged.

In the embodiment of the present invention, as described above, in a state in which the gallium of the core is solid at a temperature equal to or lower than the melting point, the volume of the space inside the shell is made equal to or larger than the volume of the gallium. In the production of such a microcapsule, (1) when gallium in a liquid state is covered with a shell, a production method including heating gallium from a melting point to expand its volume by 3.2% or more (volume is about 1.03 times or more) in advance and then covering the gallium with a shell is used, or (2) a production method including cooling gallium to a temperature equal to or lower than the melting point, and then covering the gallium with a shell is used.

Hereinafter, a method for producing a latent heat storage body microcapsule according to an embodiment of the present invention will be described in the order of (1) a production including covering gallium in a liquid state with a shell, and (2) a production method including covering gallium in a solid state with a shell. The method (1) corresponds to the method for producing a gallium/gallium oxide microcapsule, and the method (2) corresponds to the method for producing a gallium/gallium hydrate microcapsule.

(1) Production Method Including Covering Gallium in Liquid State with Shell

Method for Producing Gallium/Gallium Oxide Microcapsule (1-1) Production Method

Figure 3:
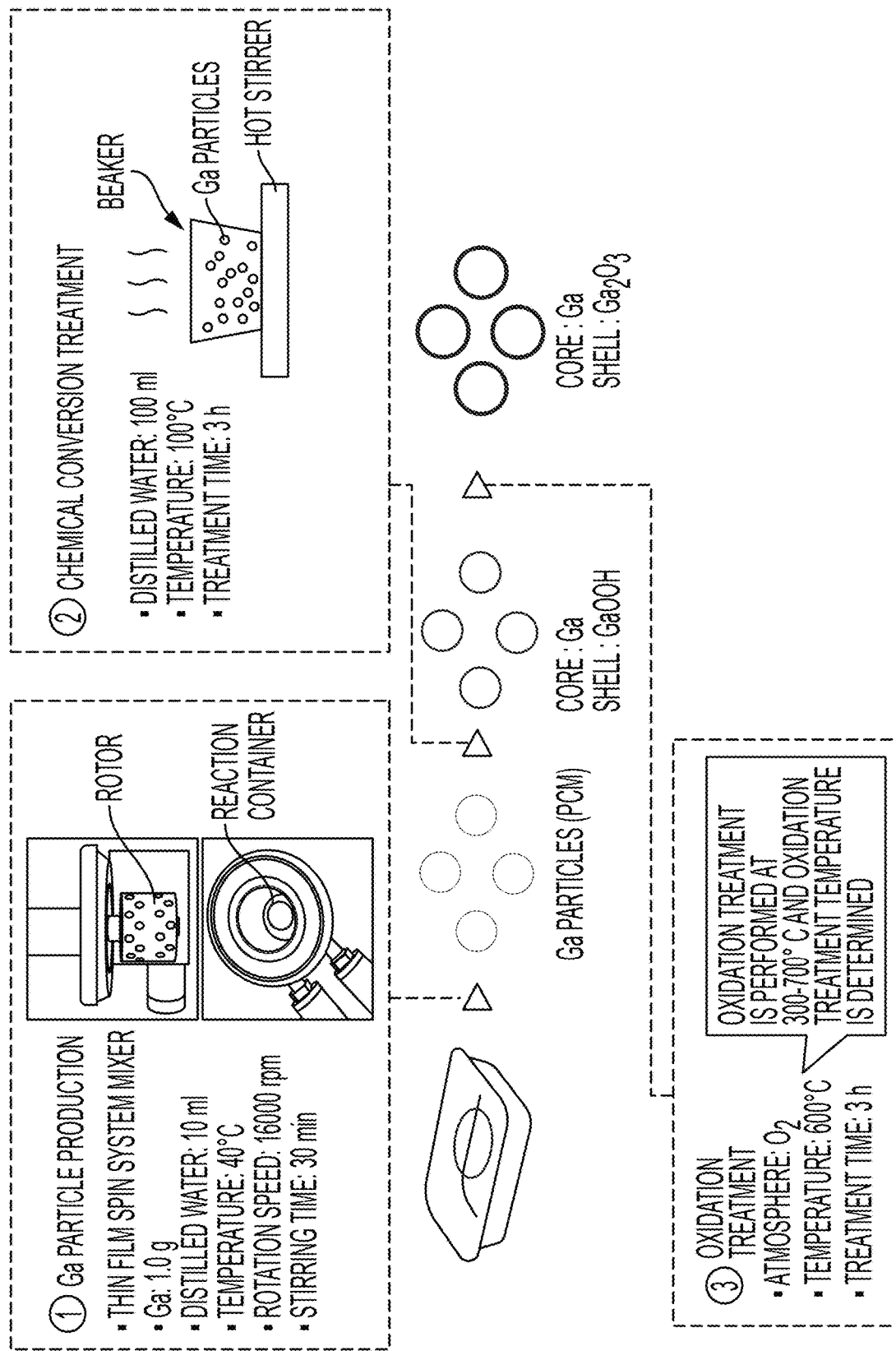
FIG. 3 is a view for explaining a method for producing a latent heat storage body microcapsule in which gallium in a liquid state is covered with a shell.

FIG. 3 is a view for explaining a method for producing a latent heat storage body microcapsule including covering gallium in a liquid state with a shell. The production method includes three steps [1] to [3] shown in FIG. 3.

[1] Gallium Particle Production Step

A thin film spin system mixer is prepared, and 1.0 g of gallium and 10 ml of distilled water are put into a reaction container. The temperature of the distilled water is equal to or higher than the melting point of gallium (about 29.8° C.) and is held here at 40° C. Because the melting point of gallium is about 29.8° C., the gallium is a liquid in this state.

Subsequently, the rotor is rotated at a rotation speed of 16000 rpm for 30 minutes to stir the distilled water containing gallium. As a result, liquid gallium particles having a diameter of about 30 μm are dispersed in the distilled water.

[2] Chemical Conversion Treatment (Water Treatment) Step

To the distilled water in which the liquid gallium particles are dispersed, distilled water is further added to make a total of 100 ml. The temperature of distilled water is maintained at 100° C. and stirred with a hot stirrer for 3 hours. As a result, the surface of each of the gallium particles is covered with a thin gallium hydrate, for example, GaOOH.

[3] Oxidation Treatment Step

The gallium particles are discharged from the distilled water and subjected to an oxidation treatment. The sample is held in an oxygen atmosphere at a temperature within a range of 300° C. to 700° C., for example, at 600° C. for 3 hours. In this step, the GaOOH film is changed to a solid gallium oxide film by the dehydration reaction. In addition, along with the volume expansion of Ga as the core, a crack is generated in the film of the gallium oxide, and at the same time, the liquid Ga existing in the vicinity of the crack instantaneously reacts with oxygen in the atmosphere to form a gallium oxide. The gallium oxide generated by the oxidation of the liquid Ga covers and integrates with the crack portion generated in the gallium oxide film derived from the GaOOH film, whereby the surface of each of the gallium particles is covered with the solid gallium oxide.

As described above, gallium has a melting point of about 29.8° C. and expands by 3.2% in volume when it solidifies from a liquid to a solid. For this reason, in the microcapsule in which liquid gallium is covered with a solid gallium oxide, there is a problem that the volume of gallium expands when gallium solidifies and the microcapsule becomes damaged. Therefore, in this oxidation treatment step, the surface is oxidized in a state where the volume of the liquid gallium is expanded by 3.2% in advance, and the gallium is covered with the solid gallium oxide.

Specifically, when heated to about 280° C., the liquid gallium expands by about 3.2% in volume. Here, heating to 600° C. is performed to form a shell of a gallium oxide on the surface of gallium.

Through the above steps, a latent heat storage body microcapsule in which a core including liquid gallium (Ga) is covered with a shell including solid gallium oxide ($Ga_2O_3$) is completed.

(1-2) Evaluation of Gallium/Gallium Oxide Microcapsule

For the latent heat storage body microcapsule produced by the production method according to the embodiment of the present invention, particle surface/cross section observation (SEM-EDS)
shell identification (XRD)
latent heat amount/melting point measurement (DSC)
repeated heat storage and release test were performed to evaluate the latent heat storage body microcapsule.

Particle Surface/Cross Section Observation (SEM-EDS)

Figure 4:
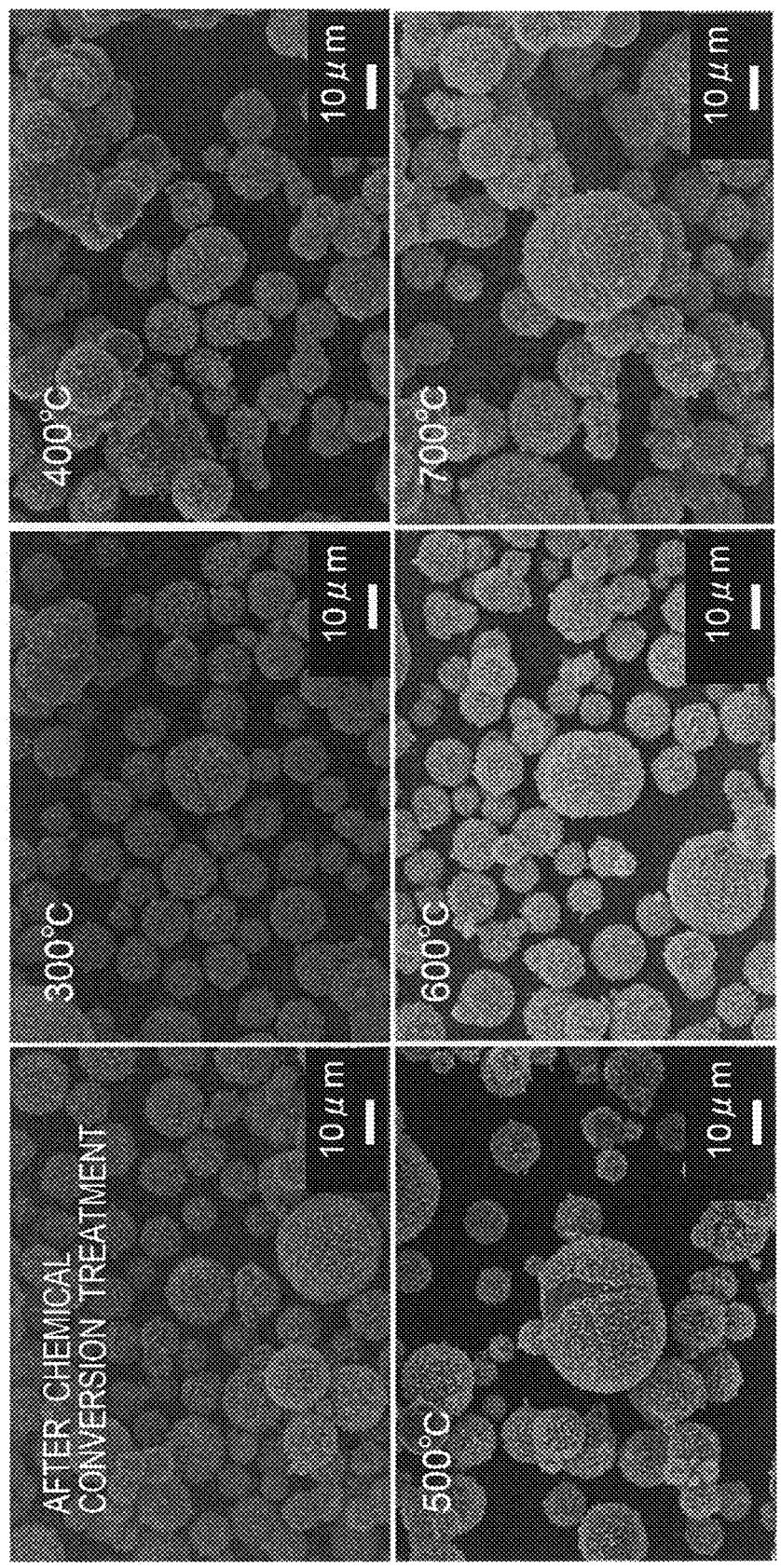
FIG. 4 shows SEM photographs of surfaces when an oxidation temperature in an oxidation treatment step is changed.

FIG. 4 is SEM-EDS photographs of the surfaces when the oxidation temperature in [3] oxidation treatment step is set to 300° C., 400° C., 500° C., 600° C., and 700° C. The other oxidation treatment conditions are the same.

In the SEM photographs of FIG. 4, spherical objects are microcapsules whose surfaces are covered with a gallium oxide. When the oxidation temperature is 300° C., 400° C., or 500° C., the gallium oxide on the surface is cracked (for example, the microcapsules in the middle of the photograph of 300° C.), and the gallium inside the microcapsule is exposed. On the other hand, such cracks are not observed at 600° C. and 700° C. It is considered that this is because, even when a crack occurred, the exposed gallium was reoxidized and self-repaired.

As described above, when 600° C. and 700° C. are used as the oxidation treatment temperature, the core can be covered with the shell of the gallium oxide in a state in which the gallium of the core is expanded by 3.2% or more, and the encapsulation of the gallium is successful.

Shell Identification (XRD)

Figure 5:
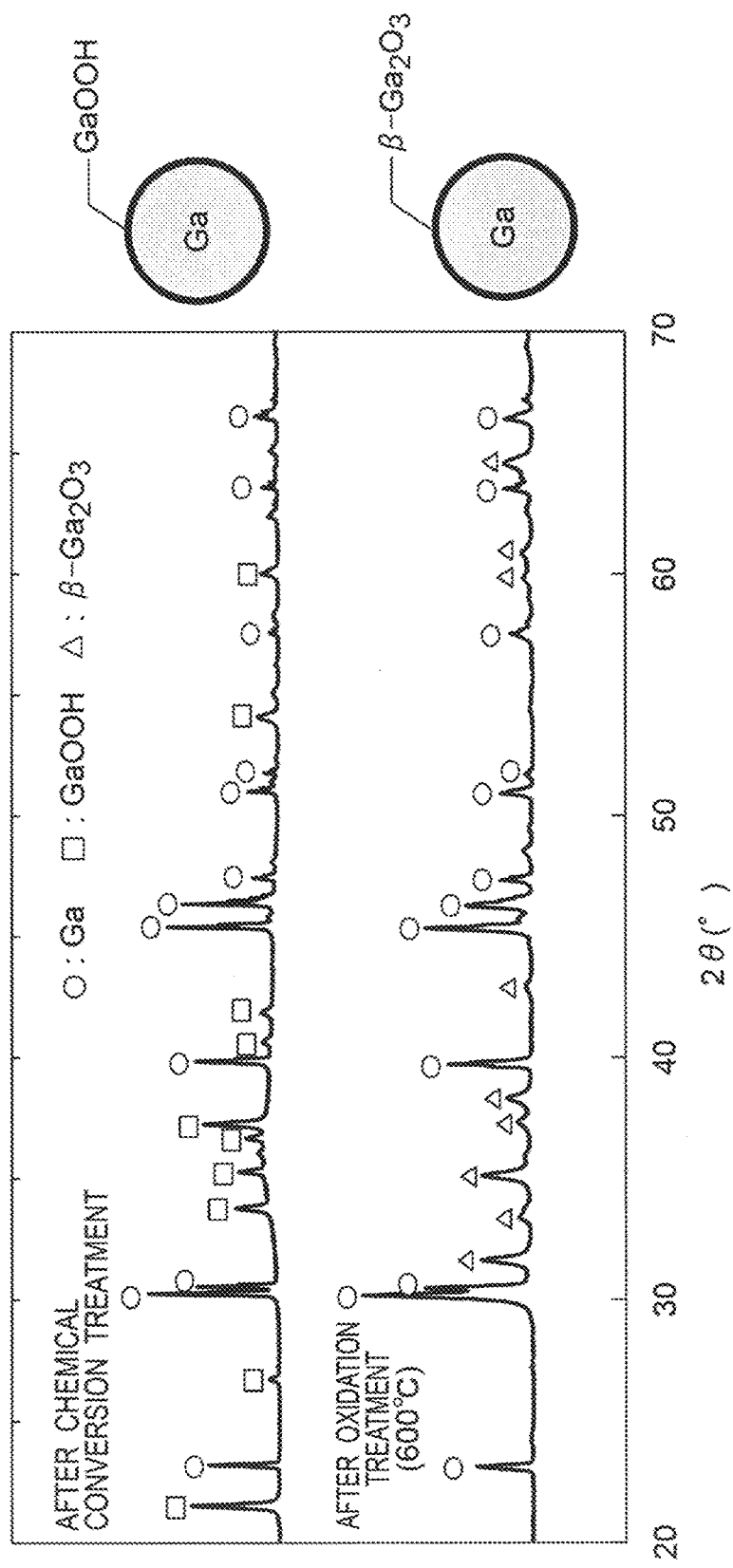
FIG. 5 shows results of examining a gallium oxide forming a shell by XRD.

FIG. 5 shows results of examining a gallium oxide forming a shell by XRD (X-ray diffraction method). A sample after the chemical conversion treatment and a sample subjected to the oxidation treatment at 600° C. for 3 hours in an oxygen atmosphere were used. In the sample after the chemical conversion treatment, GaOOH (□) was detected together with Ga (○). On the other hand, in the sample after the oxidation treatment, $\beta$-$Ga_2O_3$ (Δ) was detected instead of GaOOH (Δ).

From FIG. 5, it can be seen that a microcapsule in which the surface of the Ga core is covered with a shell of GaOOH is formed after the chemical conversion treatment, and a microcapsule in which the surface of the Ga core is covered with a shell of $\beta$-$Ga_2O_3$ is formed after the oxidation treatment.

Latent Heat Amount/Melting Point Measurement (DSC)

Figure 6:
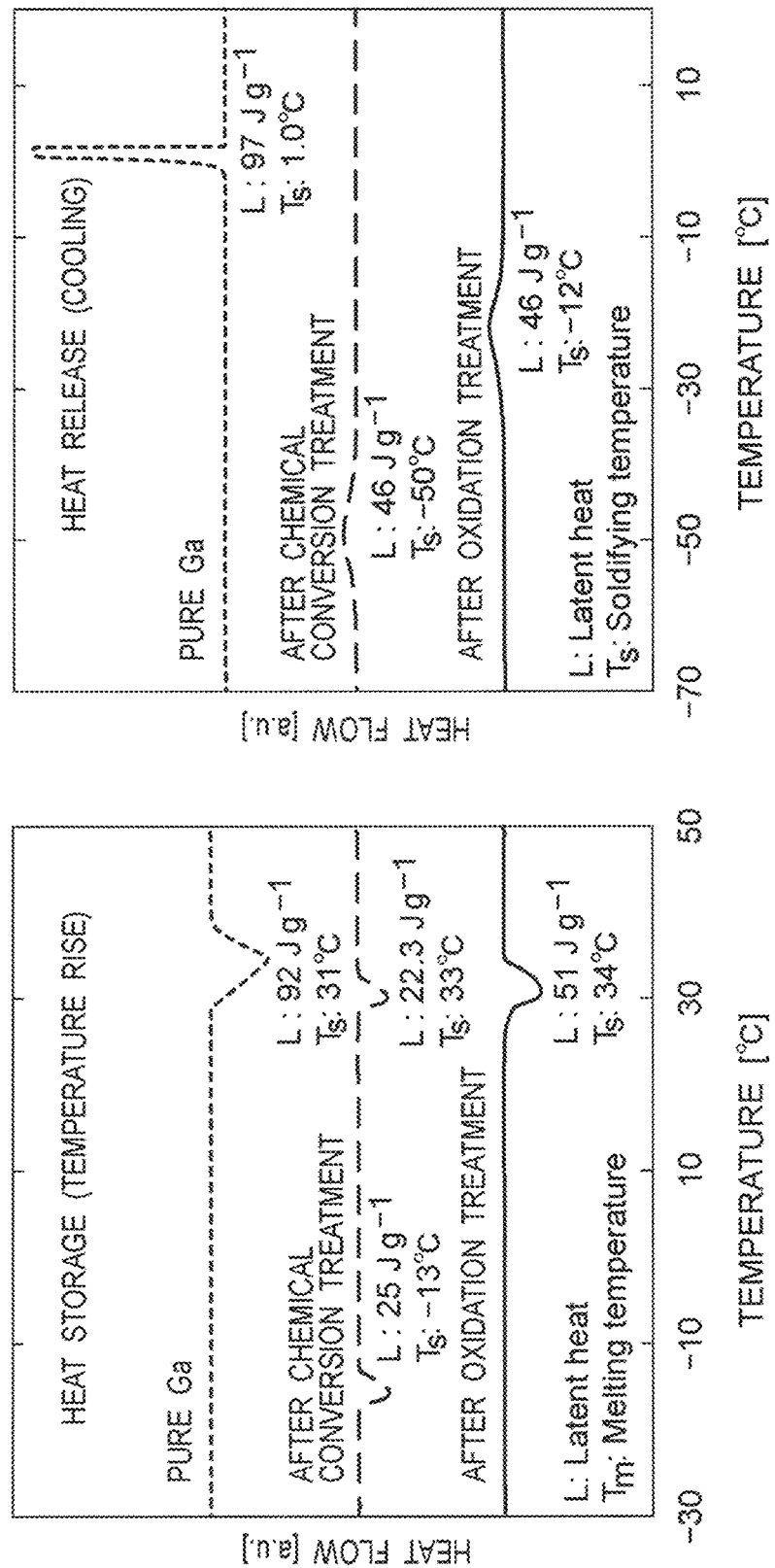
FIG. 6 shows results of differential scanning calorimetry of latent heat amount and melting point.

FIG. 6 shows the results of differential scanning calorimetry (DSC) of latent heat amount and melting point. The left diagram shows a state at the time of heat storage (temperature rise), the right diagram shows a state at a time of heat release (cooling), in which the horizontal axis represents the temperature, and the vertical axis represents the heat flow. In FIG. 6, L represents latent heat, and Tm represents melting point. Chemical conversion treatment conditions and oxidation treatment conditions are the same as those in FIG. 5.

In the left diagram of FIG. 6, the latent heat is 92 J/g for pure Ga, 47.3 (25+22.3) J/g after the chemical conversion treatment, and 51 J/g after the oxidation treatment. In the right diagram, the latent heat is 97 J/g for pure Ga, 46 J/g after the chemical conversion treatment, and 46 J/g after the oxidation treatment. It can be seen that the latent heat amount of about 50% of pure Ga can be maintained after the chemical conversion treatment and the oxidation treatment as shown.

On the other hand, in the samples after the chemical conversion treatment and the oxidation treatment, a decrease in melting point (supercooling) was observed as compared with pure Ga.

Repeated Heat Storage and Release Test

Figure 7:
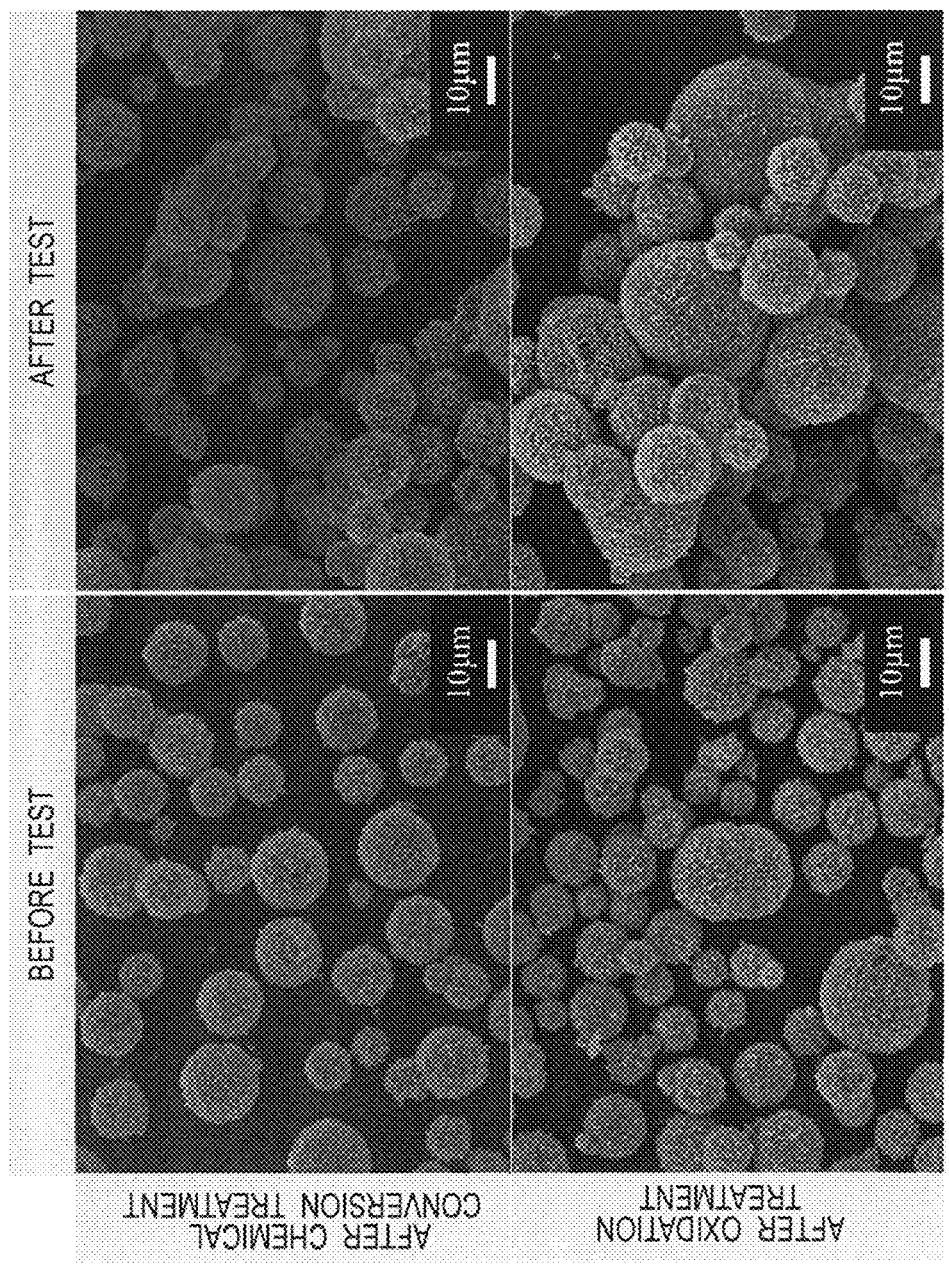
FIG. 7 shows SEM photographs before and after a repeated heat storage and release test is performed on a sample after a chemical conversion treatment and after an oxidation treatment.

FIG. 7 is SEM-EDS photographs before and after a repeated heat storage and release test is performed on a sample after the chemical conversion treatment and the oxidation treatment. The upper part of FIG. 7 shows a state after the chemical conversion treatment and the lower part of FIG. 7 shows a state after the oxidation treatment, each of which is the SEM photographs before and after the heat storage and release test. Conditions for the chemical conversion treatment and the oxidation treatment conditions are the same as those in FIG. 5. In the repeated heat storage and release, heat storage and release, that is, phase transformation between a solid phase and a liquid phase was performed 10 times in a temperature range of −80° C. to 50° C.

As can be seen from FIG. 7, in the sample after the chemical conversion treatment (Ga core and GaOOH shell), damage was observed in some of the shells after the test. On the other hand, in the sample after the oxidation treatment (Ga core and $\beta$-$Ga_2O_3$ shell), aggregation was observed in some of the particles, but the shell was not damaged, and it was confirmed that favorable microcapsules were formed.

Figure 8:
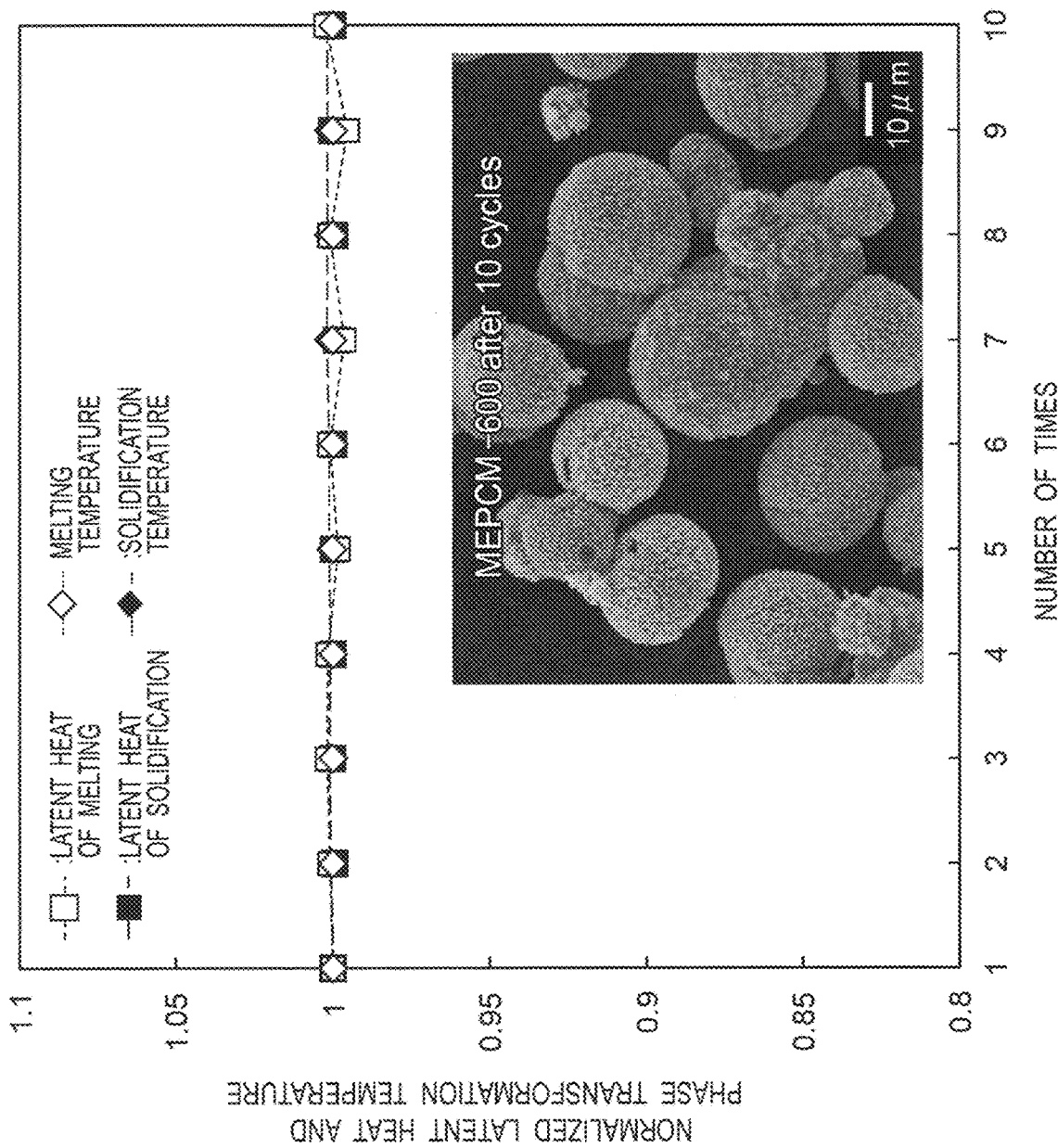
FIG. 8 shows a relationship between the number of times (cycles) of phase transformation and normalized latent heat and phase transformation temperature of a sample after an oxidation treatment, including a surface SEM photograph of the sample after a repeated heat storage and release test.

FIG. 8 shows the relationship between the number (cycles) of phase transformation and normalized latent heat and phase transformation temperature when the phase transformation between the solid phase and the liquid phase is repeated 10 times (combination of melting and solidification is 10 times) as the repeated heat storage and release test for a sample after the oxidation treatment (oxidation temperature: 600° C.), including a surface SEM photograph of the sample after the repeated heat storage and release test. The horizontal axis represents the number (cycles) of phase transformation, and the vertical axis represents the normalized latent heat and phase transformation temperature. The normalization is represented by a value when the initial value is 1 (value divided by the value of the first phase transformation).

As can be seen from FIG. 8, even when the phase transformation between the solid phase and the liquid phase was repeated 10 times, the latent heat of melting, the latent heat of solidification, the melting temperature, and the solidification temperature were hardly changed, and were changed within a range of ±0.0001 with respect to the initial values. That is, it is found that the heat storage and release characteristics are stable even when the phase transformation is repeated.

In addition, in the SEM photograph of FIG. 8, although leakage or aggregation of the Ga core is observed in some samples, most of the particles maintain a spherical shape, and it is considered that the heat storage and release characteristics are stable because of this.

In this manner, by performing [1] gallium particle production step, [2] chemical conversion treatment (water treatment) step, and [3] oxidation treatment step, a microcapsule in which Ga in a state of being expanded by 3.2% in volume was covered with a $\beta$-$Ga_2O_3$ shell was obtained. In the microcapsule, a latent heat amount of about 50% of pure Ga was obtained. As a result of the repeated heat storage and release test, it was found that the shell was hardly damaged, and stable heat storage and release characteristics were obtained.

(1-3) Adjustment of Film Thickness of Shell

Figure 9:
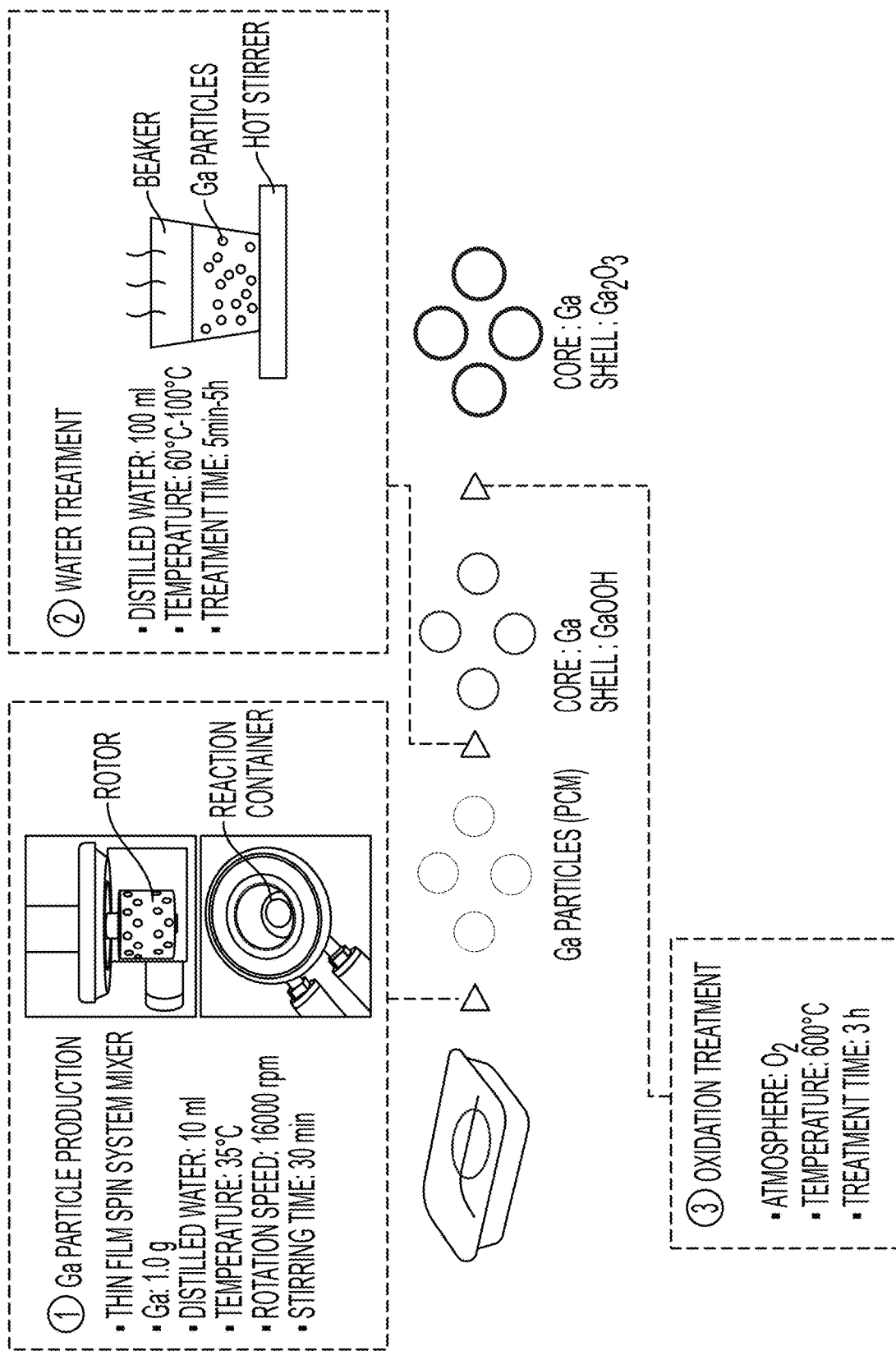
FIG. 9 is a view for explaining a method for producing a latent heat storage body microcapsule in which gallium in a liquid state is covered with a shell.

For the microcapsule in which a Ga core was covered with a $\beta$-$Ga_2O_3$ shell, the film thickness of the shell was adjusted by changing the conditions of [2] chemical conversion treatment (water treatment). FIG. 9 shows a method for producing a microcapsule in which the conditions of [1] gallium particle production and [3] oxidation treatment are fixed, and the conditions of [2] chemical conversion treatment (water treatment) are changed. The following evaluations were performed on a sample to which [1] gallium particle production step and [2] chemical conversion treatment (water treatment) step have been performed and [3] oxidation treatment step has not been performed. In other words, the shell was evaluated in a state of a precursor of the $\beta$-$Ga_2O_3$ shell.

The conditions of [1] gallium particle production were the same as those in FIG. 1 except that the temperature of distilled water was 35° C. For [2] chemical conversion treatment (water treatment), the temperature was selected within a range of 60° C. to 100° C., and the treatment time was selected within a range of 5 minutes to 5 hours.

For the produced microcapsule,
  particle surface observation (SEM-EDS)
  shell identification (XRD)
  latent heat amount/melting point measurement (DSC)
  repeated heat storage and release test
were performed to evaluate the latent heat storage body microcapsule.

Particle Surface Observation (SEM-EDS)

Figure 10:
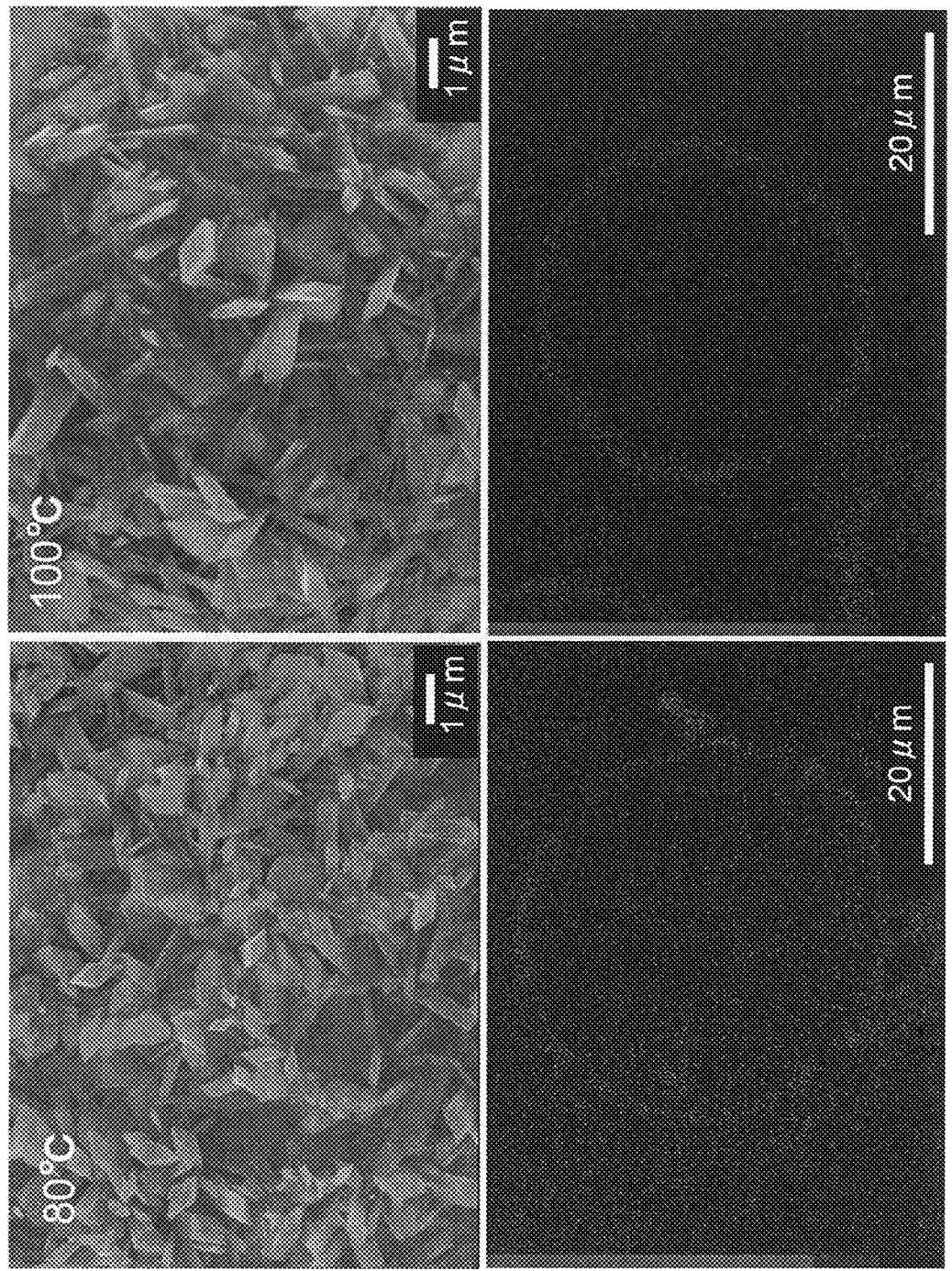
FIG. 10 is SEM photographs of a latent heat storage body microcapsule after chemical conversion treatment at 80° C. and 100° C.

FIG. 10 is SEM photographs of microcapsules after chemical conversion treatment (water treatment) at 80° C. and 100° C., where the water treatment temperature was 60° C., 70° C., 80° C., and 100° C., and the water treatment time was 3 hours. The upper part is surface photographs, and the lower part is cross-sectional photographs. It can be seen that a shell (GaOOH crystal) is formed on the surface of the Ga core when the water treatment temperature is 80° C. and 100° C. The film thickness of the shell is larger at 100° C. than at 80° C. On the other hand, in the samples with chemical conversion treatment temperatures of 60° C. and 70° C., no precipitate was formed on the surface.

Shell Identification (XRD)

Figure 11:
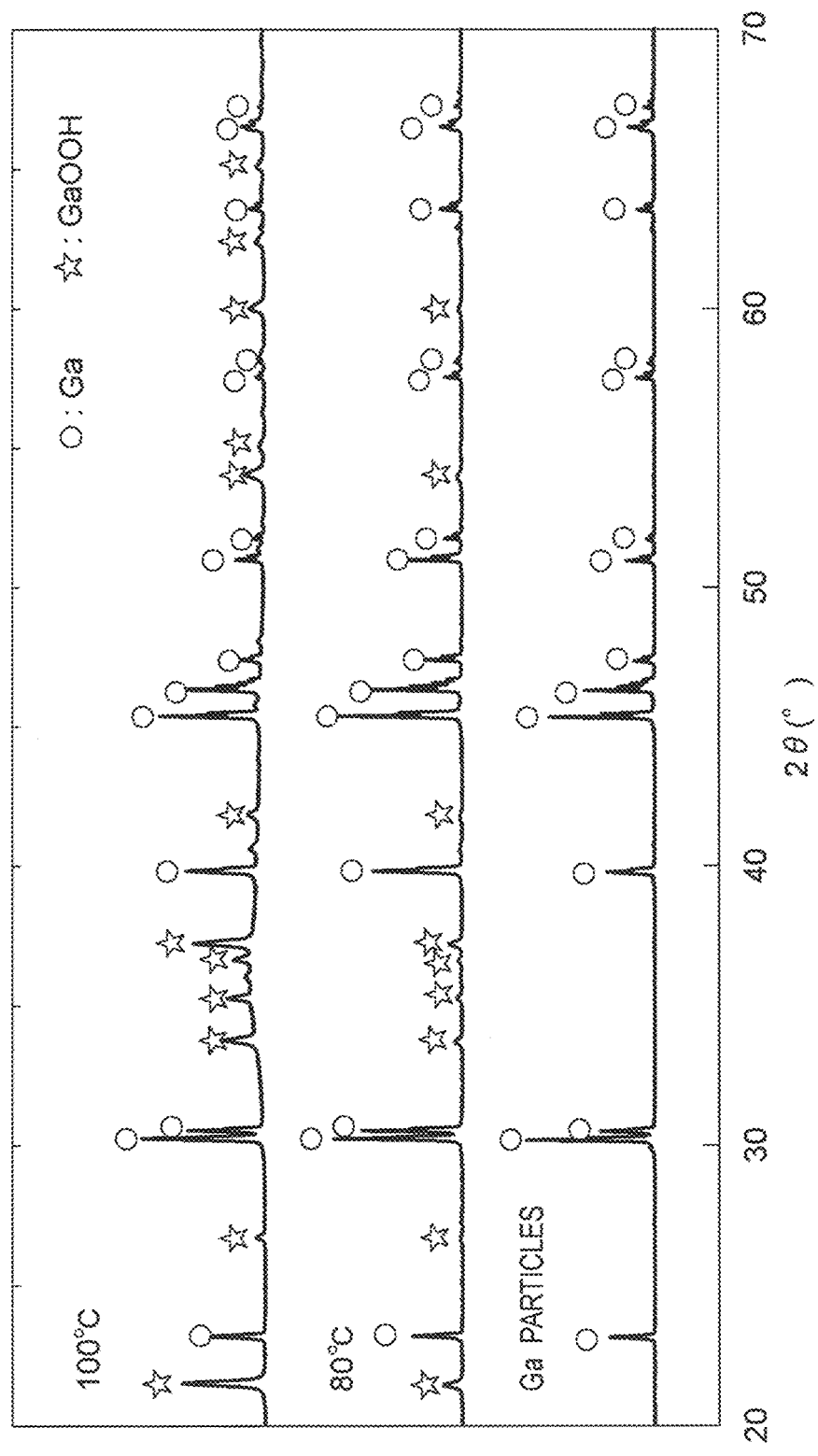
FIG. 11 shows XRD analysis results of a shell when a water treatment temperature is 80° C. and 100° C., and a water treatment time is 3 hours.

FIG. 11 shows the results of XRD analysis of the shell when the water treatment temperature was 80° C. and 100° C. at which the shell was precipitated on the surface of the Ga core and the water treatment time was 3 hours. A peak attributed to GaOOH, which was not observed in the Ga particles before the water treatment, was observed in the sample subjected to the water treatment at 80° C. and 100° C., and it is found that GaOOH was precipitated as a shell. In particular, a larger peak was observed in the sample subjected to the water treatment at 100° C. It is considered that this GaOOH becomes $\beta$-$Ga_2O_3$ in the subsequent oxidation treatment.

Latent Heat Amount/Melting Point Measurement (DSC)

Figure 12:
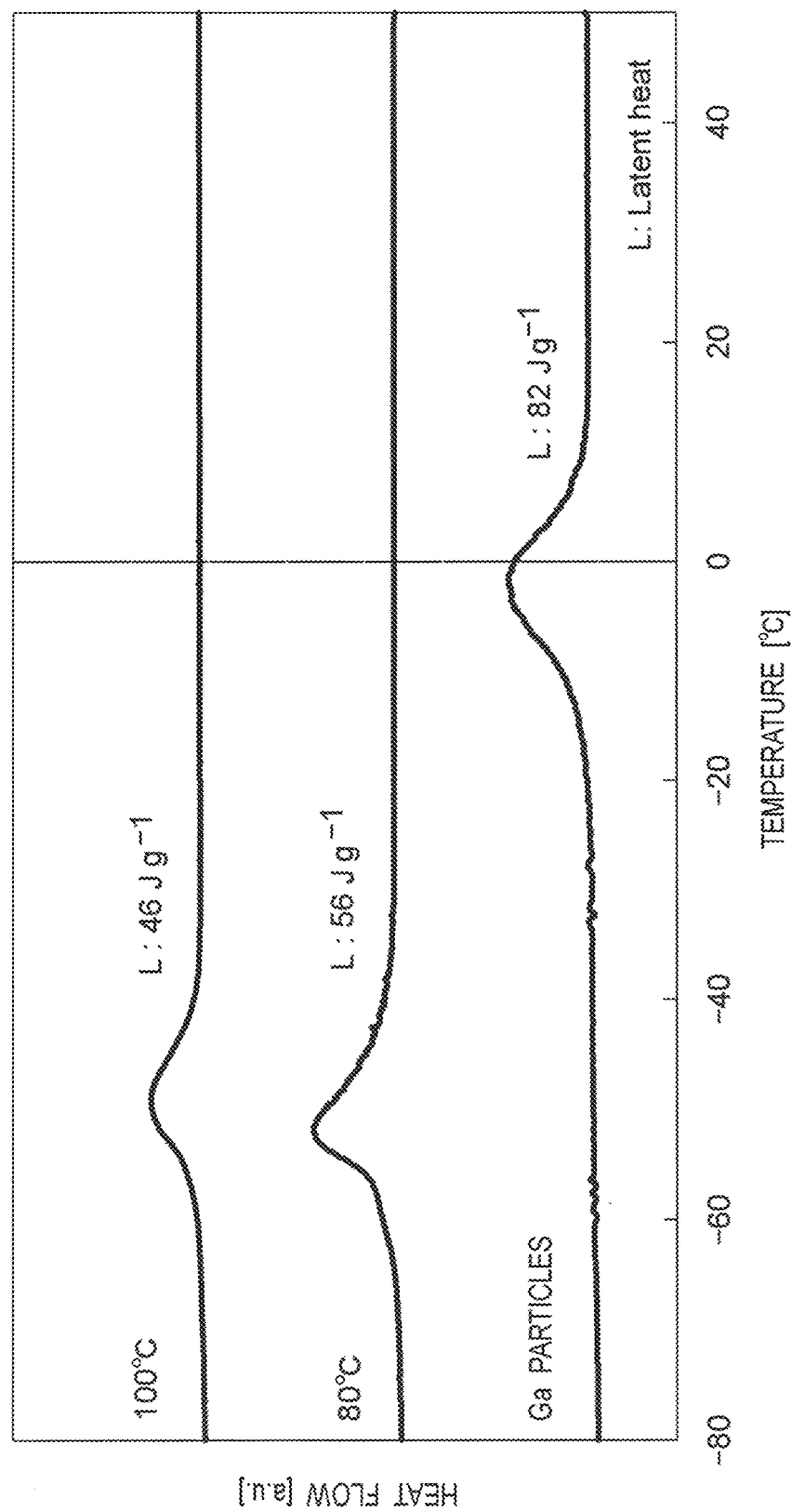
FIG. 12 shows results of measuring a latent heat amount for the same sample as in FIG. 11.

FIG. 12 shows the results of measuring the latent heat amount for the same sample as in FIG. 11. In FIG. 12, the horizontal axis represents the temperature, and the vertical axis represents the heat flow. The latent heat of the Ga particles is 82 J/g, but the latent heat of the samples at 80° C. and 100° C. is 56 J/g and 46 J/g, respectively. It is considered that the latent heat was reduced by covering the core of Ga with the shell of GaOOH. In particular, the sample at 100° C. is considered to have a film thickness of the shell larger than that of the sample at 80° C. In addition, in the samples at 80° C. and 100° C., a decrease in melting point (supercooling) is observed.

Next, for the samples with the chemical conversion treatment time of 5 minutes, 15 minutes, 3 hours, and 5 hours and the water treatment temperature of 100° C. at which the film thickness was the largest from the results of FIGS. 10 to 12,
  particle surface observation (SEM-EDS)
  shell identification (XRD)
  latent heat amount/melting point measurement (DSC)
  repeated heat storage and release test
were performed to evaluate the latent heat storage body microcapsule.

Particle Surface Observation (SEM-EDS)

Figure 13:
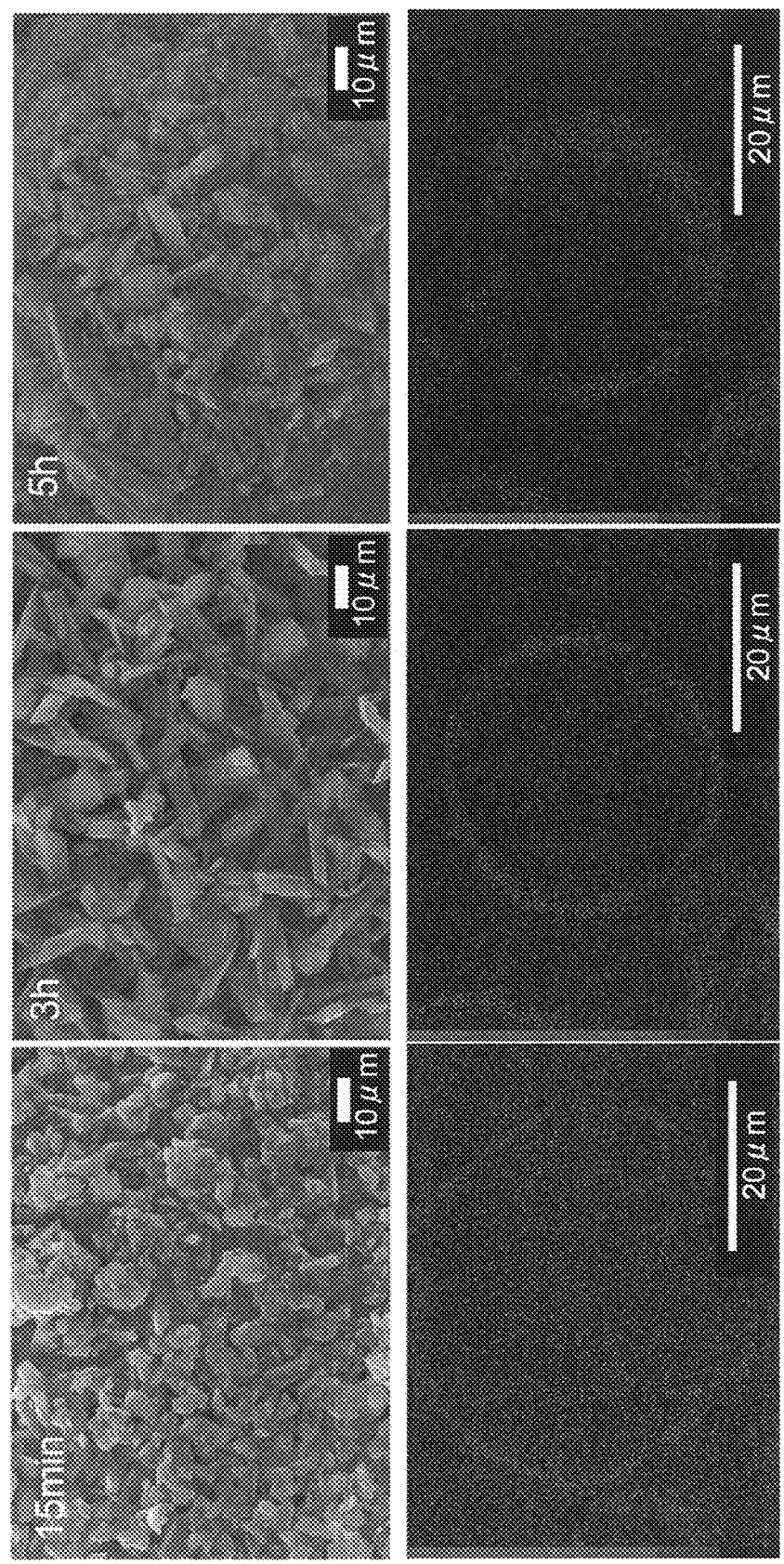
FIG. 13 is SEM photographs of a latent heat storage body microcapsule after water treatment when the water treatment time is 15 minutes, 3 hours, and 5 hours.

FIG. 13 is SEM photographs of a microcapsule after the water treatment when the water treatment time is 15 minutes, 3 hours, and 5 hours. The upper part is surface photographs, and the lower part is cross-sectional photographs. The water treatment temperature is 100° C. It can be seen that a shell (GaOOH crystal) is formed on the surface of the Ga core when the water treatment time is 15 minutes or more. The film thickness of the shell increases as the water treatment time increases. In the sample when the water treatment time is 5 minutes, no precipitate was formed on the surface.

Figure 14:
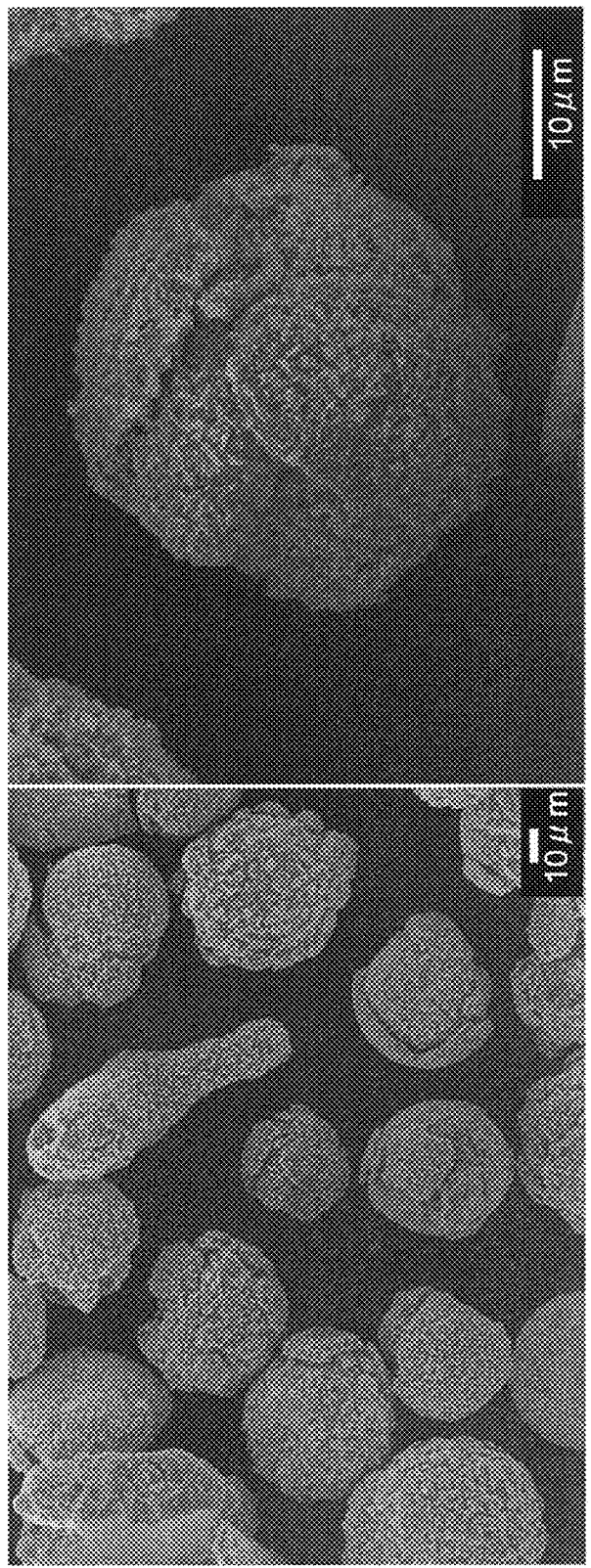
FIG. 14 is SEM photographs of a latent heat storage body microcapsule when the water treatment time is 5 hours and the treatment temperature is 100° C.

FIG. 14 is SEM photographs of a microcapsule when the water treatment time is 5 hours and the treatment temperature is 100° C. (right end in FIG. 13). Although the shape is slightly distorted from the spherical shape, it can be seen that a shell having a large film thickness is formed.

Shell Identification (XRD)

Figure 15:
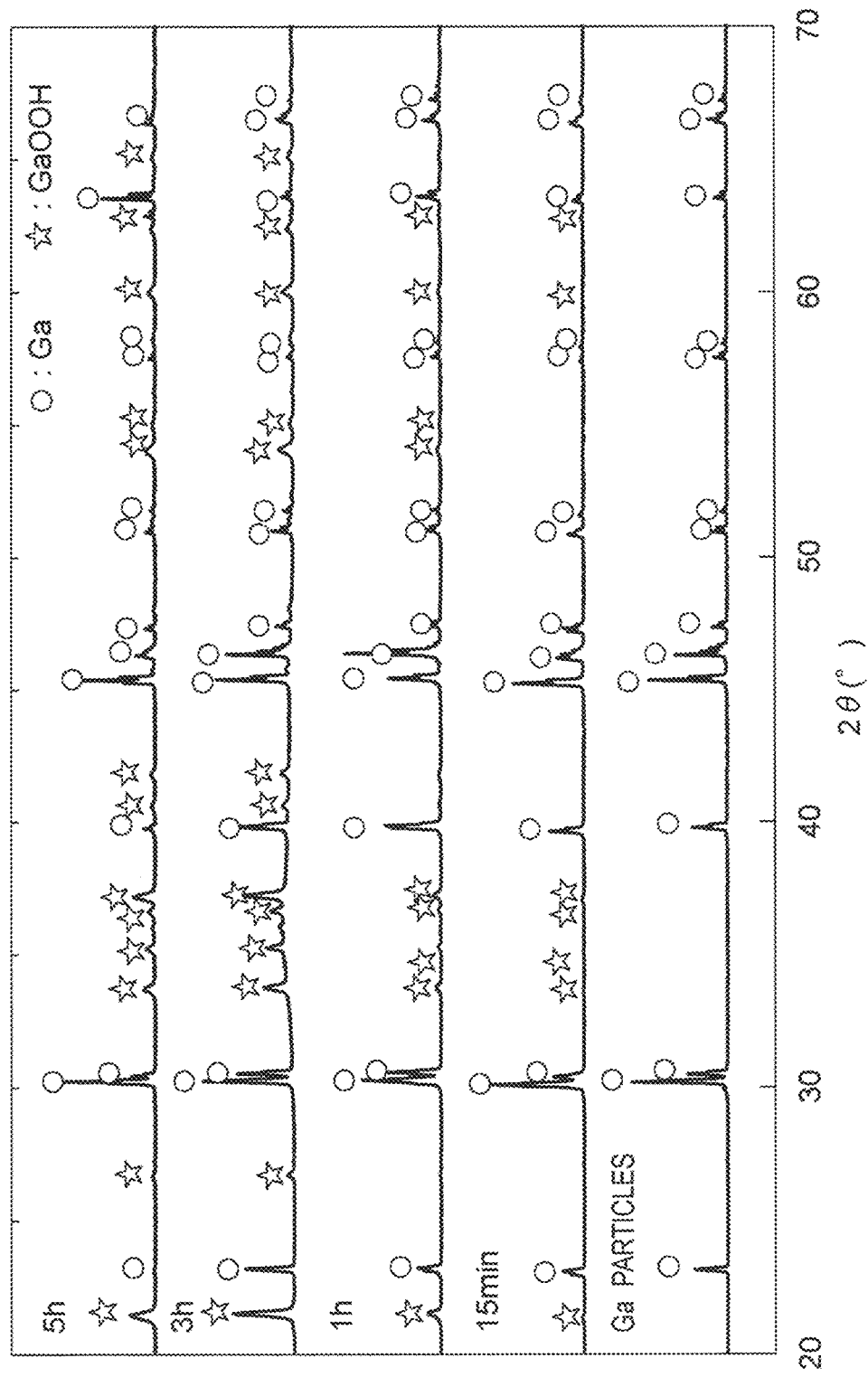
FIG. 15 shows XRD analysis results of a shell when the water treatment temperature is 100° C., and the water treatment time is changed.

FIG. 15 shows the XRD analysis results of the shell when the water treatment temperature was 100° C. and the water treatment time was 15 minutes, 1 hour, 3 hours, and 5 hours. A peak attributed to GaOOH, which was not observed in the Ga particles before the water treatment, was observed in the sample subjected to the water treatment for 15 minutes or more, and it is found that GaOOH was precipitated as a shell.

Latent Heat Amount/Melting Point Measurement (DSC)

Figure 16:
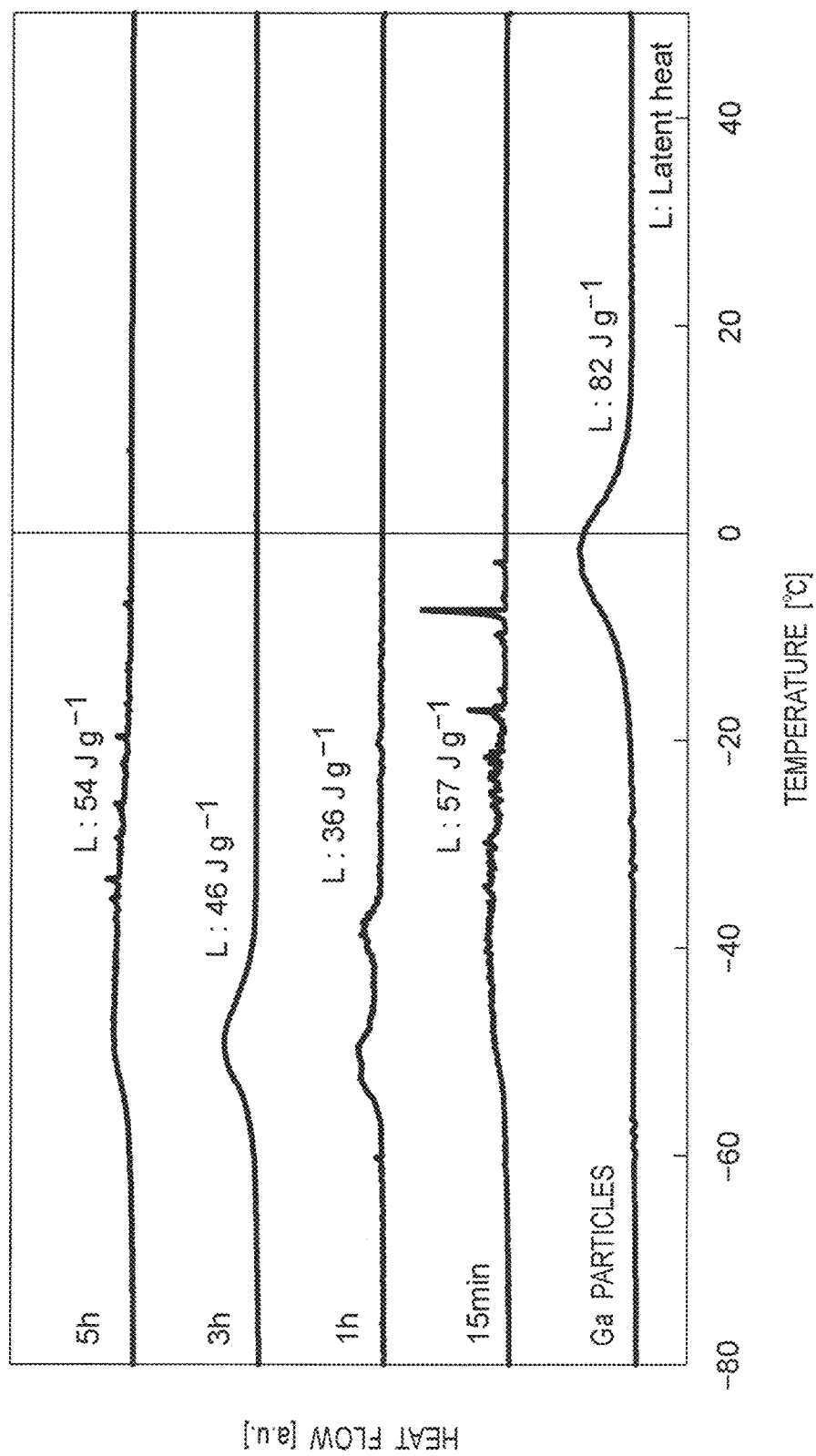
FIG. 16 shows results of measuring a latent heat amount for the same sample as in FIG. 15.

FIG. 16 shows the results of measuring the latent heat amount for the same sample as in FIG. 15. In FIG. 16, the horizontal axis represents the temperature, and the vertical axis represents the heat flow. The water treatment temperature is 100° C. The latent heat of the Ga particles is 82 J/g, but the latent heat of the samples with water treatment times of 15 minutes, 1 hour, 3 hours, and 5 hours is 57 J/g, 36 J/g, and 54 J/g, respectively. It is considered that the latent heat was reduced by covering the core of Ga with the shell of GaOOH. In addition, a decrease in melting point (supercooling) is observed in each sample.

As described above, it has been found that a GaOOH shell is formed on the surface of each Ga particle under predetermined water treatment conditions, and in particular, the higher the water treatment temperature and the longer the water treatment time, the larger the film thickness of the shell. This GaOOH shell is considered to be a so-called precursor of the $\beta$-$Ga_2O_3$ shell formed through [3] oxidation treatment step.

(1-4) Thermal Durability Test of GaOOH Shell

Figure 17:
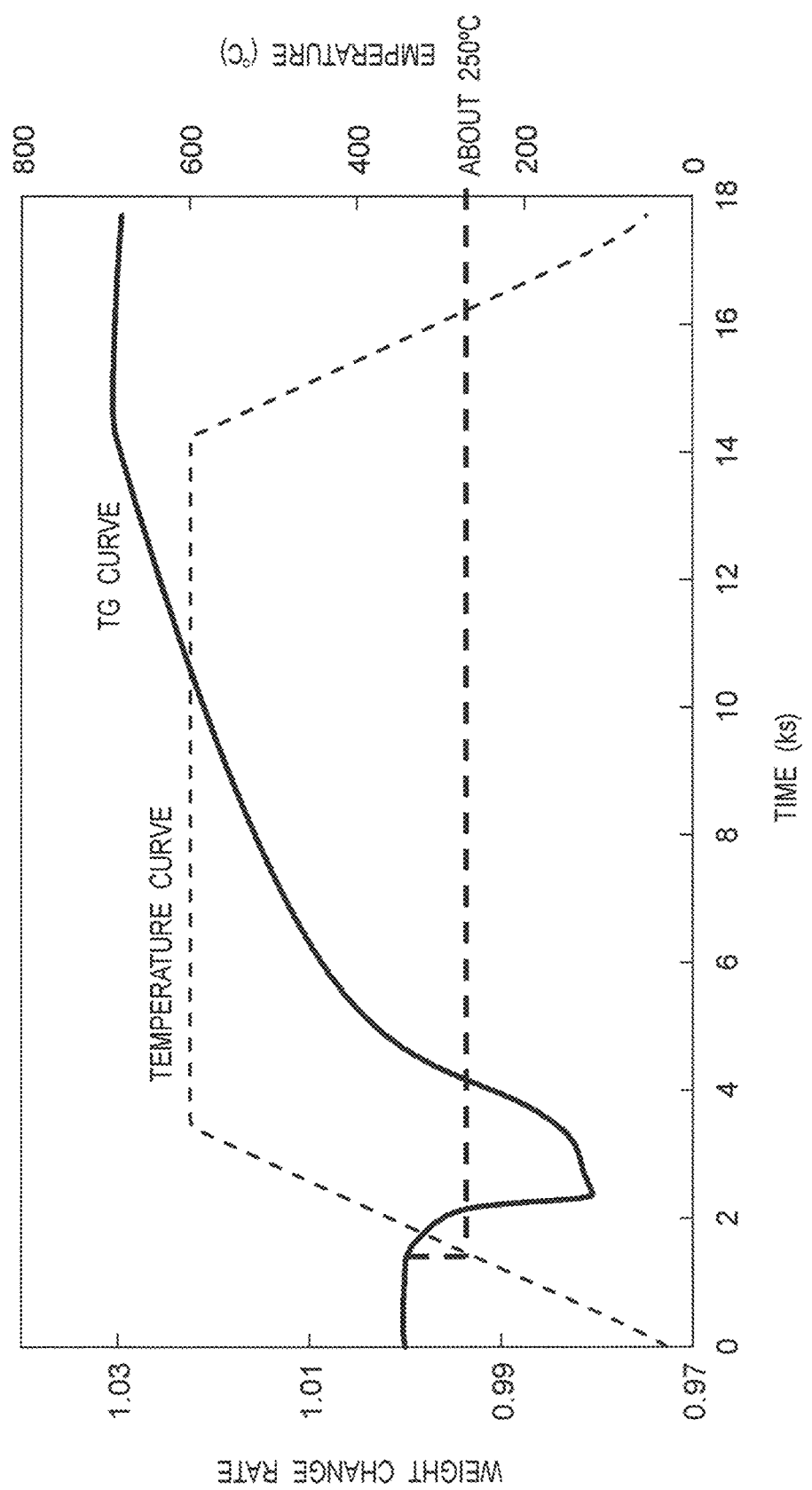
FIG. 17 shows results of a thermal durability test of a GaOOH shell.

FIG. 17 shows the results of a thermal durability test of the GaOOH shell formed on the surface of each Ga particle. In FIG. 17, the horizontal axis represents the heating time, the vertical axis represents the weight change rate and the heating temperature. FIG. 17 shows a temperature curve (broken line) and a TG curve (solid line).

When the temperature increases at a constant rate and the temperature of the sample exceeds about 250° C., the mass of the sample decreases as shown in the TG curve. It is considered that this is because the GaOOH shell dehydrated and the reaction of $$2GaOOH \rightarrow Ga_2O_3 + H_2O$$

has occurred.

(1-5) SEM and EDS After Water Treatment Step and Oxidation Treatment Step

Figure 18:
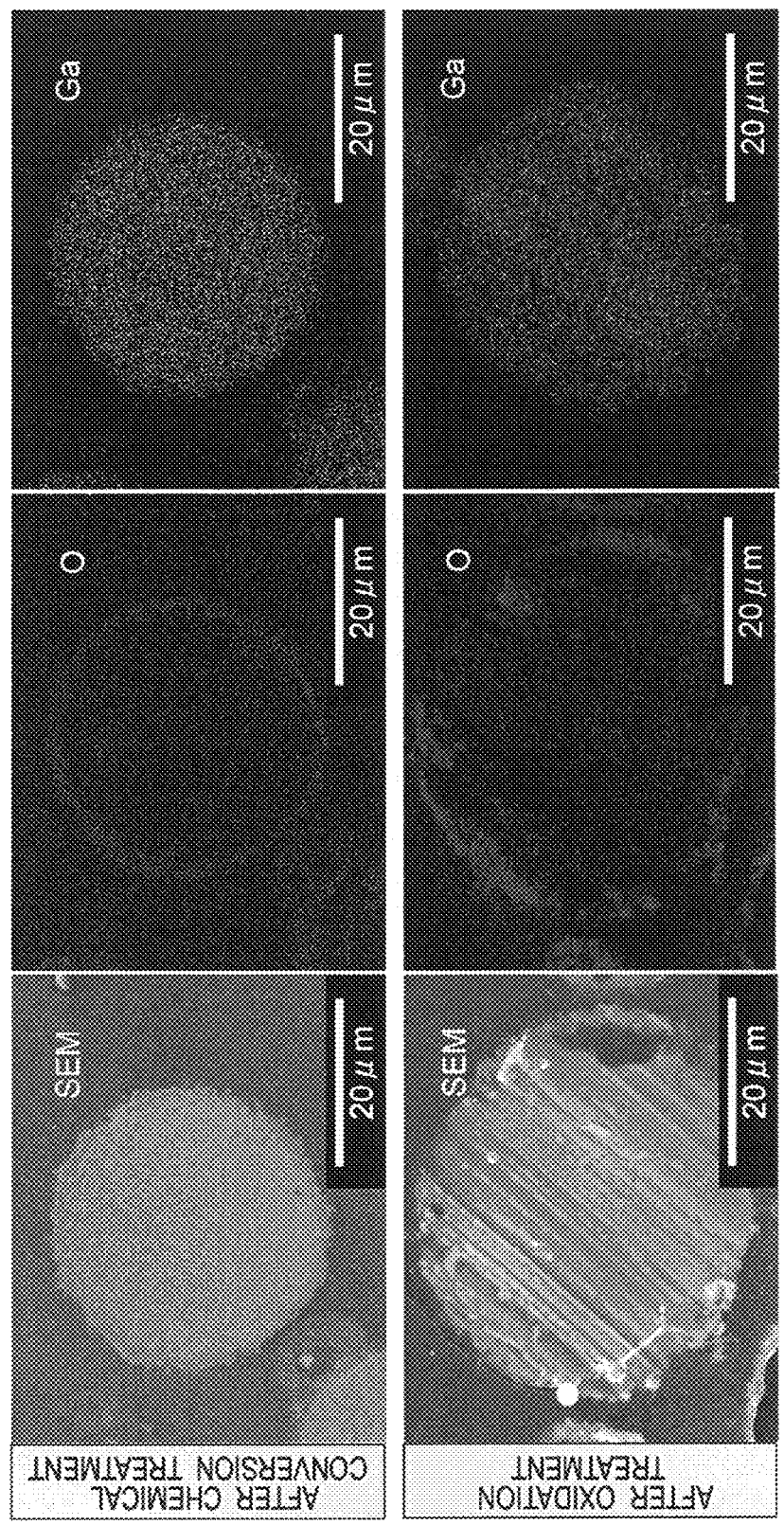
FIG. 18 shows SEM-EDS results of a cross section after a water treatment step and an oxidation treatment step.

FIG. 18 shows the results of SEM (scanning electron microscope) observation and EDS (X-ray analysis) of the cross section of the sample after [2] water treatment step and after [3] oxidation treatment step, by the method shown in FIG. 9.

The conditions of [2] water treatment are conditions in which a favorable GaOOH shell is formed at a treatment temperature of 100° C. and a treatment time of 3 hours. The conditions of [3] oxidation treatment were a treatment temperature of 600° C. and a treatment time of 3 hours in an oxygen atmosphere.

In FIG. 18, the upper part is after [2] chemical conversion treatment (water treatment) step, and the lower part is after [3] oxidation treatment step. The two photos at the left end are SEM photographs of the cross section, and the other four photos show EDS results of Ga and O. As can be seen from the SEM photographs, a shell is formed on the surface both after [2] water treatment step and after [3] oxidation treatment step. The results of EDS show that a compound of Ga and O is formed on the surface. Because [3] oxidation treatment step is performed at 600° C., which is higher than the temperature of 250° C. at which GaOOH is decomposed, it is considered that the shell after [2] water treatment step is GaOOH, and the shell after [3] oxidation treatment step is β-$Ga_2O_3$.

The film thickness of the shell is 1 to 2 µm of almost the same film thickness after [2] water treatment step and after [3] oxidation treatment step. This shows that the film thickness of the $Ga_2O_3$ shell after [3] oxidation treatment step can also be controlled by adjusting the treatment conditions (temperature, time) of [2] water treatment step and controlling the film thickness of the GaOOH shell.

(2) Production Method Including Covering Gallium in Solid State with Shell

Figure 19:
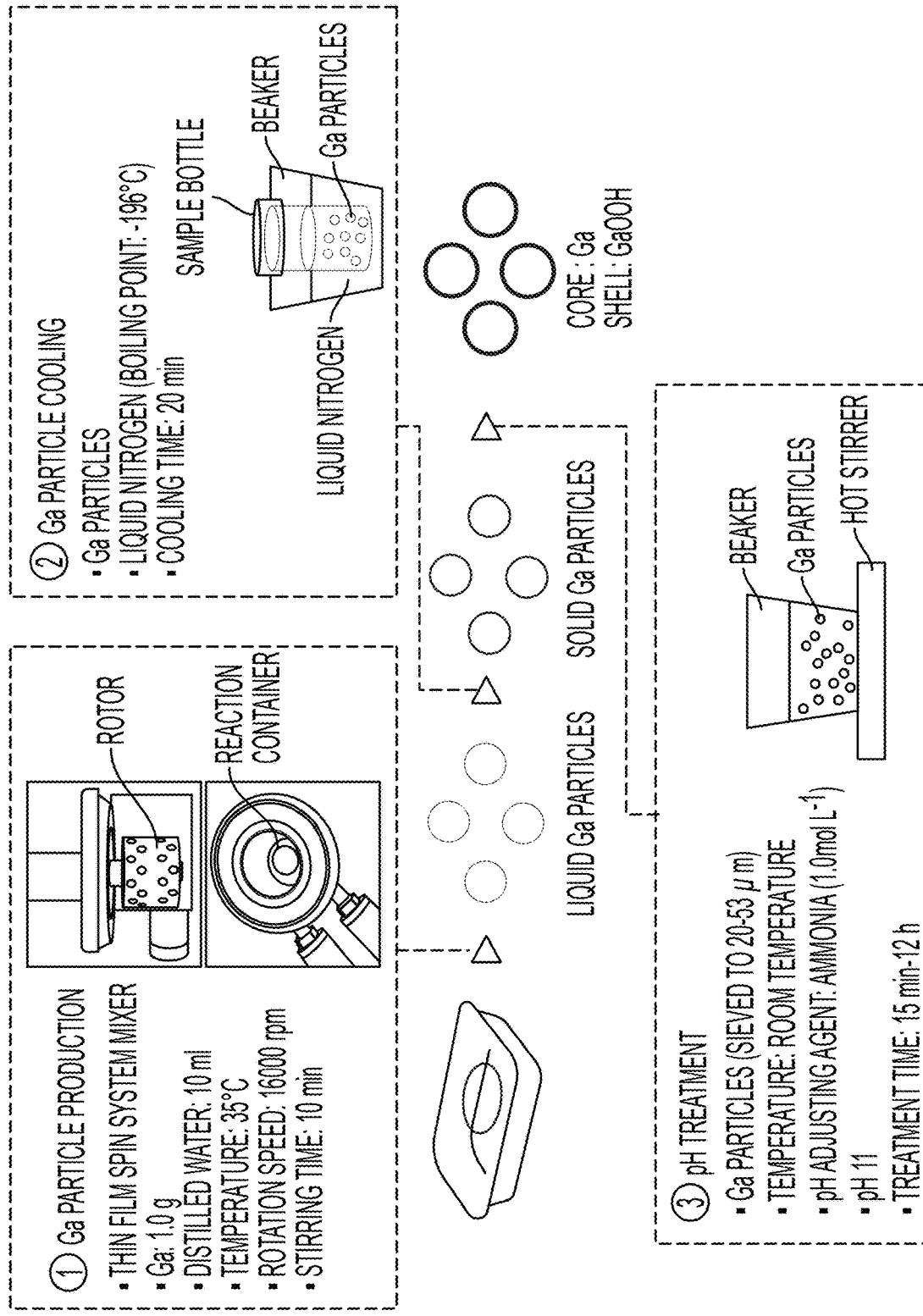
FIG. 19 is a view for explaining a method for producing a latent heat storage body microcapsule in which gallium in a solid state is covered with a shell.

Method for Producing Gallium/Gallium Hydrate Microcapsule (2-1) Production Method FIG. 19 is a view for explaining a method for producing a latent heat storage body microcapsule including covering gallium in a solid state with a shell. The production method includes three steps [1] to [3] shown in FIG. 19.

[1] Gallium Particle Production Step

A thin film spin system mixer is prepared, and 1.0 g of gallium and 10 ml of distilled water are put into a reaction container. The temperature of the distilled water is maintained at 35° C. Because the melting point of gallium is about 29.8° C., the gallium is a liquid in this state.

Subsequently, the rotor is rotated at a rotation speed of 16000 rpm for 10 minutes to stir the distilled water containing gallium. As a result, liquid gallium particles having a diameter of about 30 µm are dispersed in the distilled water.

[2] Gallium Particle Cooling Step

The liquid gallium particles are taken out, placed in a container such as a beaker, and cooled in liquid nitrogen (boiling point: −196° C.) for 20 minutes. As a result, the gallium particles are solidified, whereby solid gallium particles are obtained.

[3] pH Treatment Step

The solid Ga particles are sieved by size to select Ga particles having a diameter of 20 µm to 53 µm. The Ga particles are placed in distilled water at room temperature (25° C.) and stirred with a hot stirrer. Distilled water is adjusted to pH 11 using ammonia (1.0 mol/L) as a pH adjusting agent. The pH treatment time (immersion time) is selected between 15 minutes and 12 hours, for example, 3 hours. As a result, the surface of each of the solid gallium particles is covered with a solid gallium hydrate.

As described above, gallium has a melting point of about 29.8° C. and expands by 3.2% in volume when it solidifies from a liquid to a solid. Therefore, by covering the Ga particles in the solid state with the solid shell, it is possible to prevent damage to the shell due to volume expansion of Ga in solidification.

Through the above steps, a latent heat storage body microcapsule in which a core including solid gallium (Ga) is covered with a shell including solid gallium hydrate (GaOOH) is completed. As described above (see FIG. 17), because GaOOH is dehydrated to be $Ga_2O_3$ at 250° C. or more, the heat-resistant temperature of the gallium/gallium hydrate microcapsule is less than 250° C., and the use environment is also limited to less than about 250° C.

(2-2) Adjustment of Treatment Time

In [3] pH treatment step, the treatment time is adjusted. The pH of the solution in which Ga is to be put was fixed to 11, the temperature of the solution was fixed to room temperature (25° C.), and the treatment time for stirring with a hot stirrer was set to 15 minutes, 1 hour, 3 hours, 5 hours, 8 hours, and 12 hours. For the produced latent heat storage body microcapsule, particle surface/cross section observation (SEM-EDS)
  shell identification (XRD)
  latent heat measurement (DSC)
  repeated heat storage and release test
were performed to evaluate the latent heat storage body microcapsule.

Particle Surface Observation (SEM-EDS)

Figure 20:
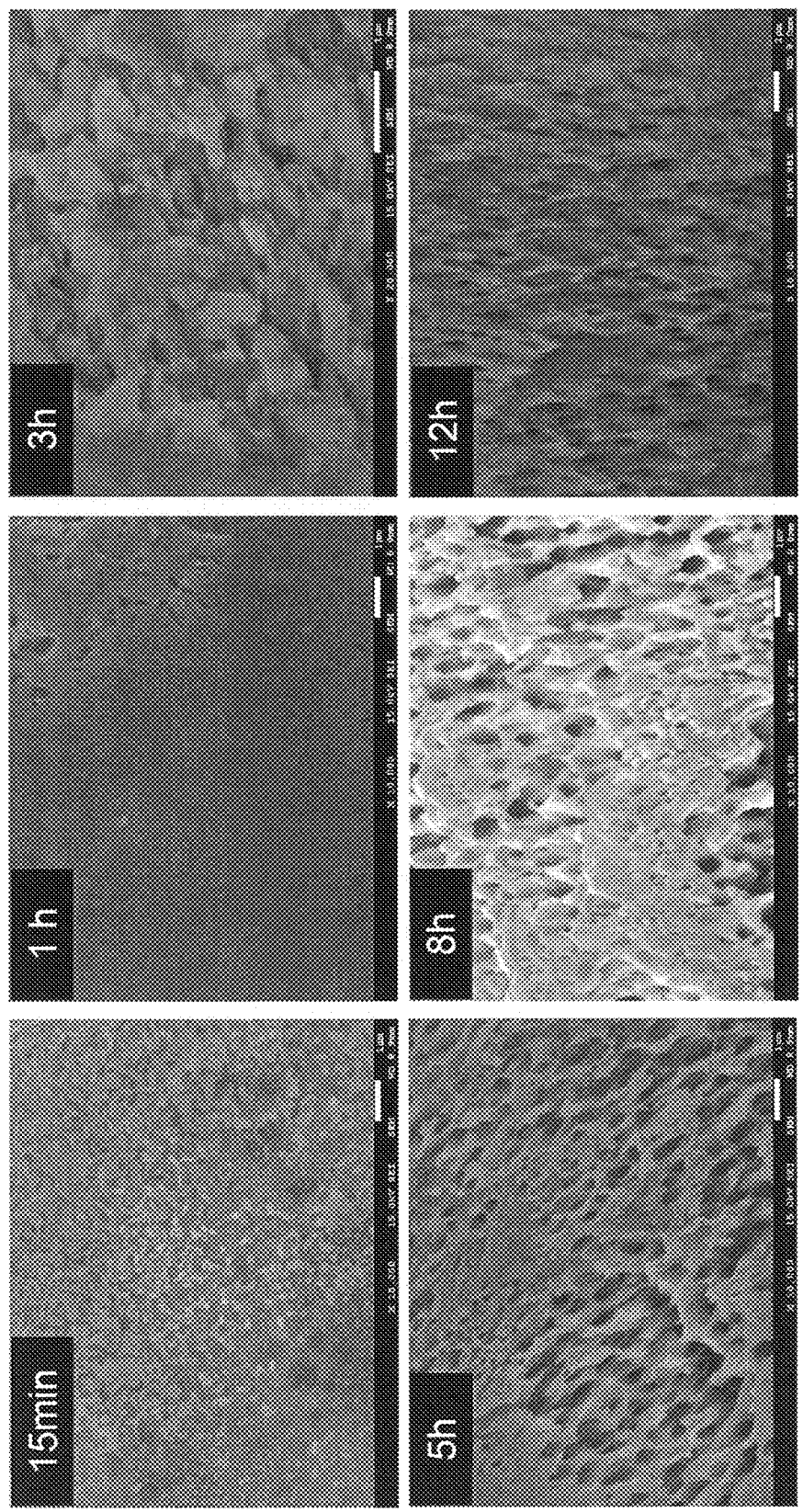
FIG. 20 is SEM photographs of a latent heat storage body microcapsule when pH treatment conditions are changed.

FIG. 20 shows SEM photographs of surfaces of the latent heat storage body microcapsules after stirring in a solution of pH 11 for 15 minutes, 1 hour, 3 hours, 5 hours, 8 hours, and 12 hours. When the treatment time was 3 hours or more, a honeycomb structure was observed on the surface of the microcapsule. It is considered that GaOOH which is a hydrate of Ga is formed around the Ga particles.

Figure 21:
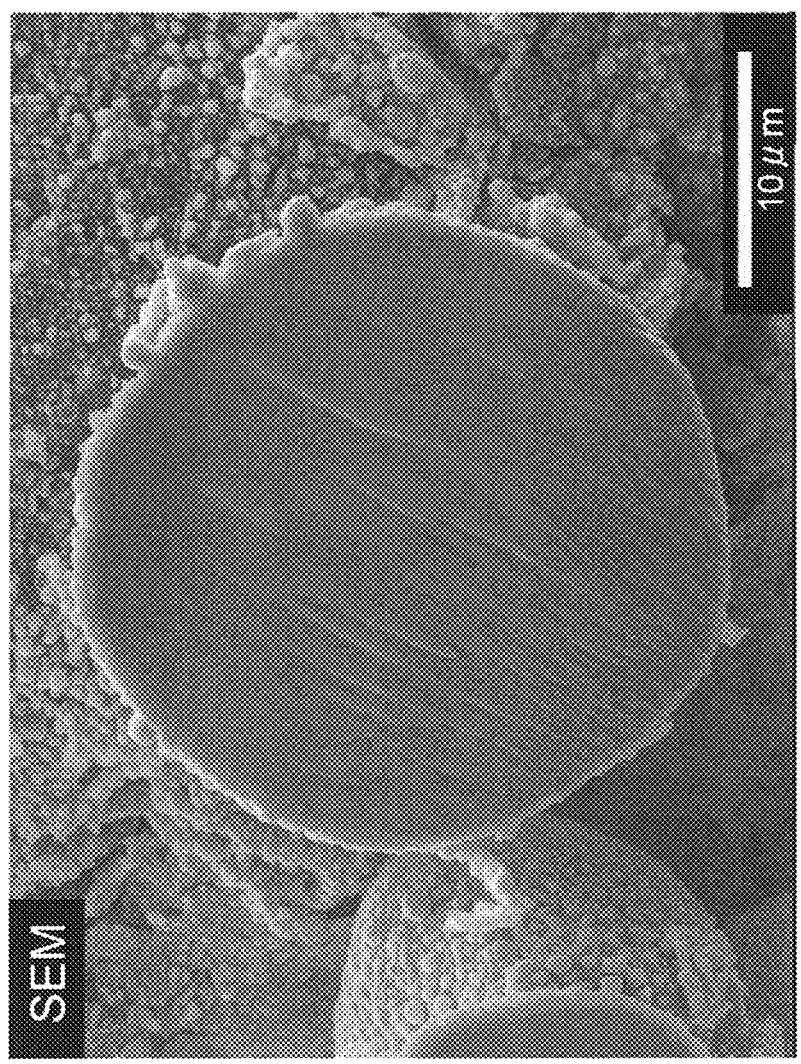
FIG. 21 is an SEM photograph of a latent heat storage body microcapsule when the pH is 11 and the treatment time is 5 hours.

FIG. 21 shows an SEM photograph of the cross section of the microcapsule when the pH is 11 and the treatment time is 5 hours. A shell having a film thickness of about 0.5 µm is observed around the Ga particle. As described above, it is considered to be a shell including GaOOH.

Shell Identification (XRD)

Figure 22:
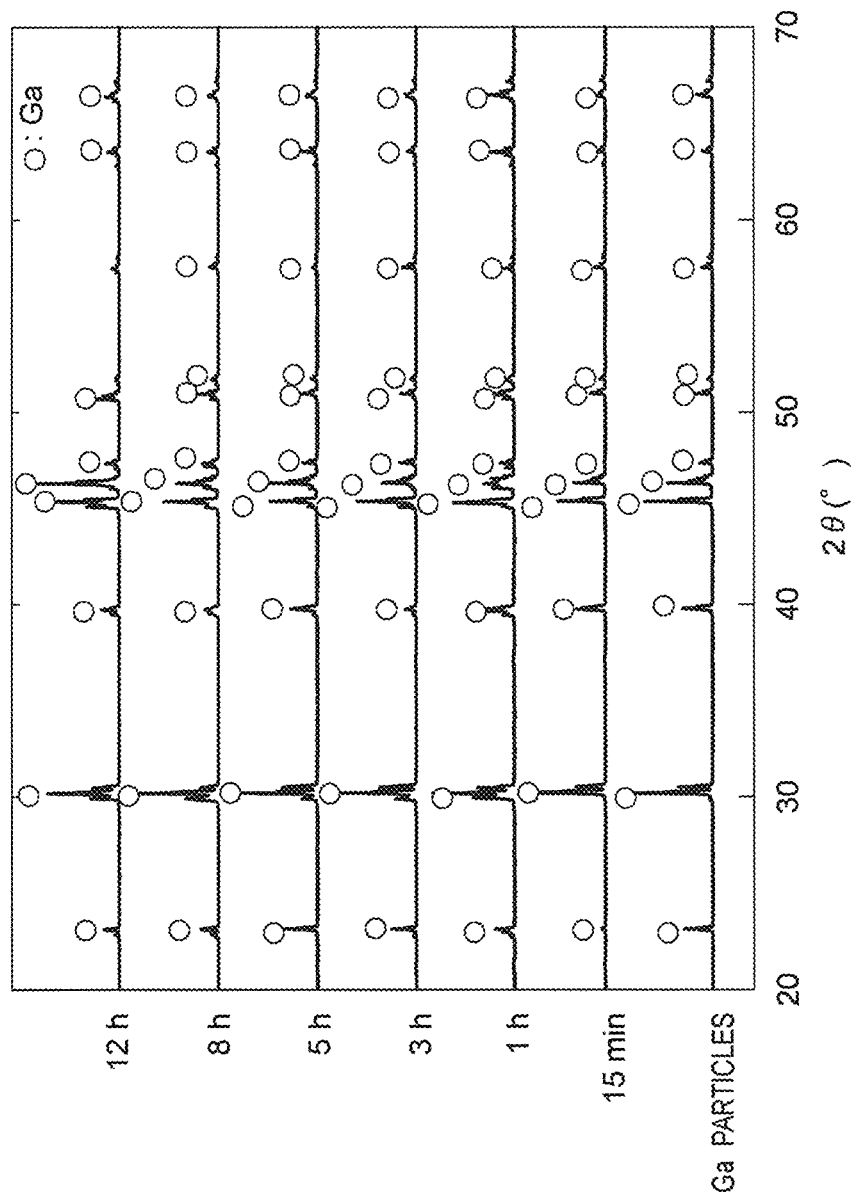
FIG. 22 shows results of X-ray diffraction performed on six samples of FIG. 20.

FIG. 22 shows the results of X-ray diffraction (XRD) performed on the six samples of FIG. 20 to identify the substance on the surface of the microcapsule. In all the samples, no peak other than Ga was observed. From the honeycomb structure of FIG. 20, it is considered that the hydrate of Ga is not in a crystalline state but in an amorphous state, and therefore GaOOH was not detected by XRD.

Next, to examine that the honeycomb structure formed on the surface of the microcapsule is GaOOH, the sample subjected to [3] pH treatment step (pH 11×5 hours) was subjected to an oxidation treatment, and the weight change was examined. The oxidation treatment was performed in an oxygen atmosphere ($O_2$ flow rate: 200 ml/min) for 30 minutes or more.

Figure 23:
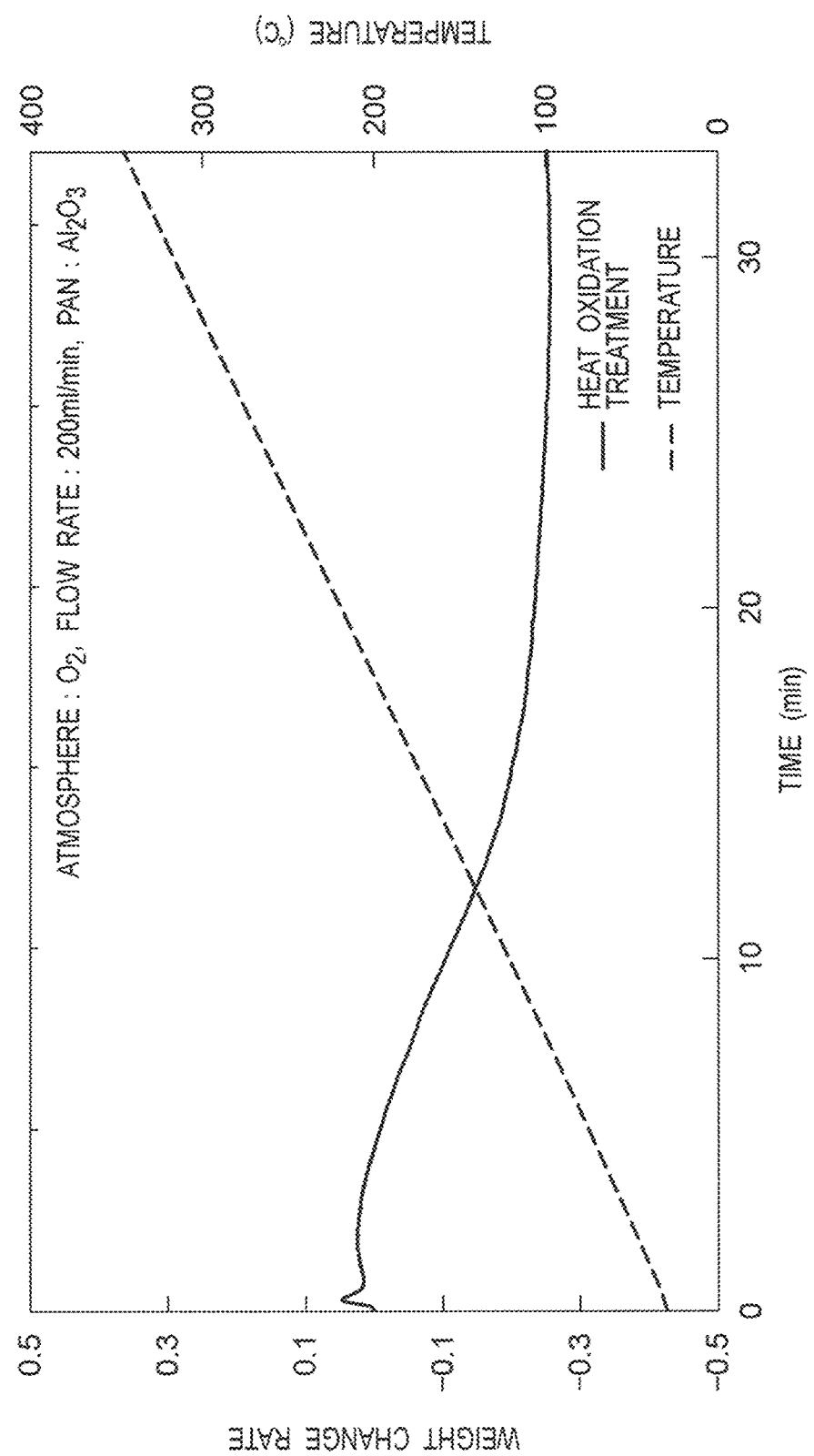
FIG. 23 shows the relationship between the oxidation treatment time and the weight change during the oxidation treatment.

FIG. 23 shows the relationship between the oxidation treatment time and the weight change in the oxidation treatment. The horizontal axis represents the oxidation treatment time, and the vertical axis represents the weight change rate and the treatment temperature. As can be seen from FIG. 22, weight reduction starts immediately after heating, and after 20 minutes, the weight becomes substantially constant.

It is considered that this weight loss is due to the dehydration of GaOOH of $$2GaOOH \rightarrow Ga_2O_3 + H_2O$$

and the honeycomb structure of FIG. 20 is considered to be GaOOH.

Latent Heat Measurement (DSC)

Figure 24:
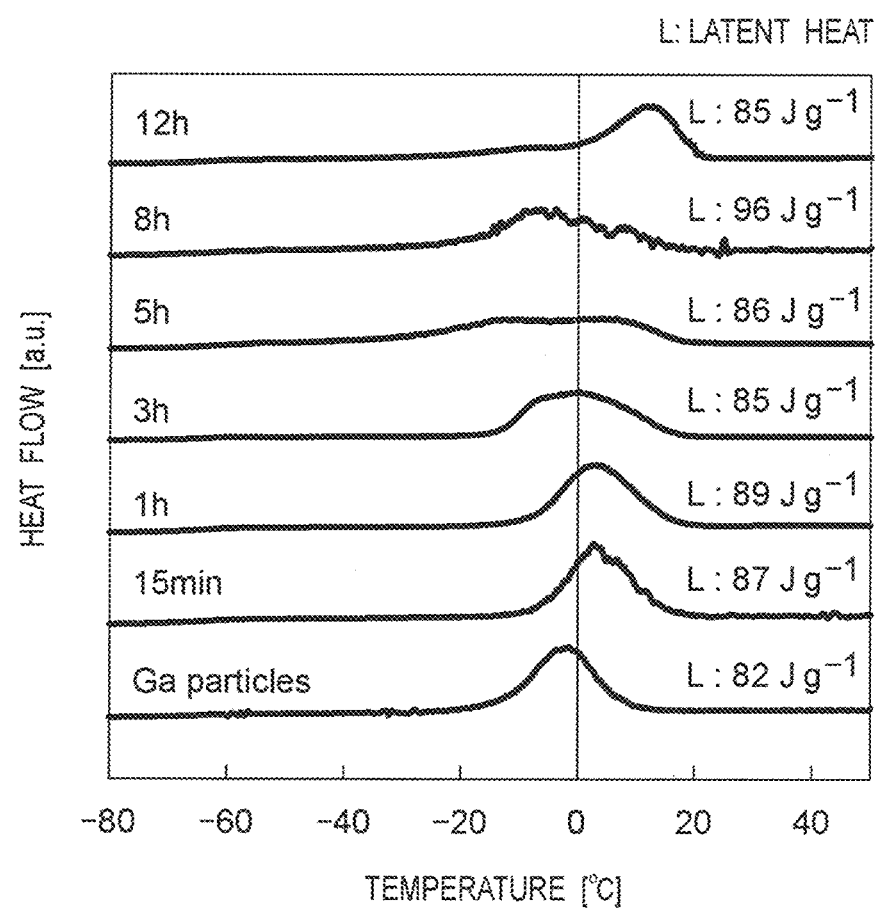
FIG. 24 shows results of differential scanning calorimetry of the latent heat for the six samples of FIG. 20.

FIG. 24 shows the results of differential scanning calorimetry (DSC) of latent heat for the six samples of FIG. 20. The measurement was performed by cooling from 50° C. to −80° C. at a cooling rate of 2° C./min. The atmosphere was an Ar atmosphere, and the Ar flow rate was 50 ml/min. While the latent heat of the Ga particles before the treatment was 82 J/g, the latent heat was 85 J/g even when the treatment time was 12 hours, and there was no large difference in the latent heat amount between the samples. This is considered to be because there is no significant change in the amount of GaOOH precipitated around the Ga particles, that is, the film thickness of the GaOOH shell even when the treatment time is prolonged.

Repeated Heat Storage and Release Test

Figure 25:
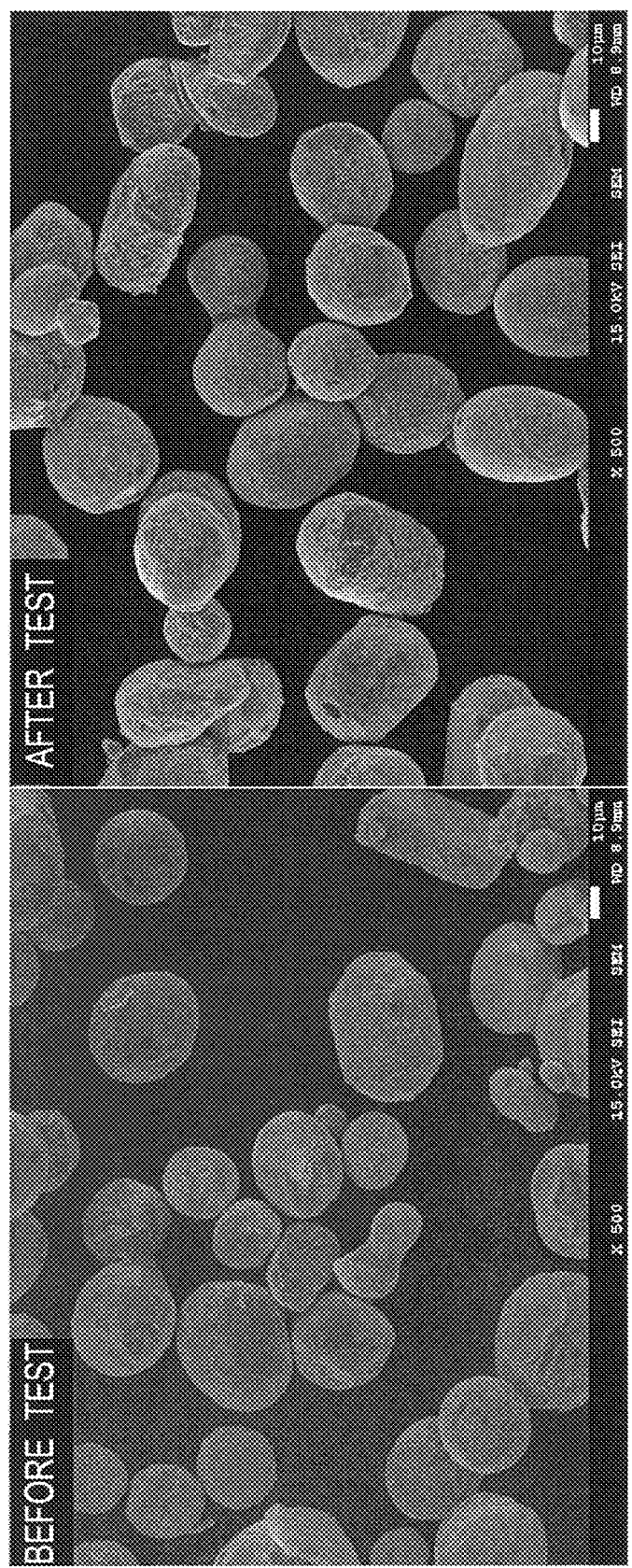
FIG. 25 is SEM photographs before and after a repeated heat storage and release test is performed on a sample when the pH is 11 and treatment time is 5 hours.

FIG. 25 shows SEM photographs before and after a repeated heat storage and release test is performed on a sample when the pH is 11 and the treatment time is 5 hours. The photo on the left is an SEM photograph before the durability test, and the photo on the right is an SEM photograph after the durability testa In the repeated heat storage and release, heat storage and release, that is, phase transformation between a solid phase and a liquid phase was performed 10 times in a temperature range of −80° C. to 50° C. The atmosphere was an Ar atmosphere, and the Ar flow rate was 50 ml/min.

As can be seen from the SEM photograph after the durability test, holes and leaks are observed in a part of the shell, but the microcapsule formed under these conditions shows favorable durability against the repeated test.

As described above, in [3] pH treatment step, by setting the pH to 11 and the treatment time to at least 5 hours, a latent heat storage body microcapsule in which a shell of GaOOH is formed in such a manner as to cover a Ga particle is obtained. In this microcapsule, a latent heat amount not different from that of a Ga particle was obtained, favorable heat storage and release characteristics were obtained, and favorable repeated durability was obtained.

(2-3) pH Adjustment

In [3] pH treatment step, the pH is adjusted. The pH of the solution in which Ga is to be put was set to 7, 8, 9, 10, and 11. The temperature of the solution was fixed to room temperature (25° C.), and the treatment time for stirring with a hot stirrer was set to 5 hours. For the produced latent heat storage body microcapsule, particle surface observation (SEM-EDS)
shell identification (XRD)
latent heat measurement (DSC)

were performed to evaluate the latent heat storage body microcapsule.

Particle Surface Observation (SEM-EDS)

Figure 26:
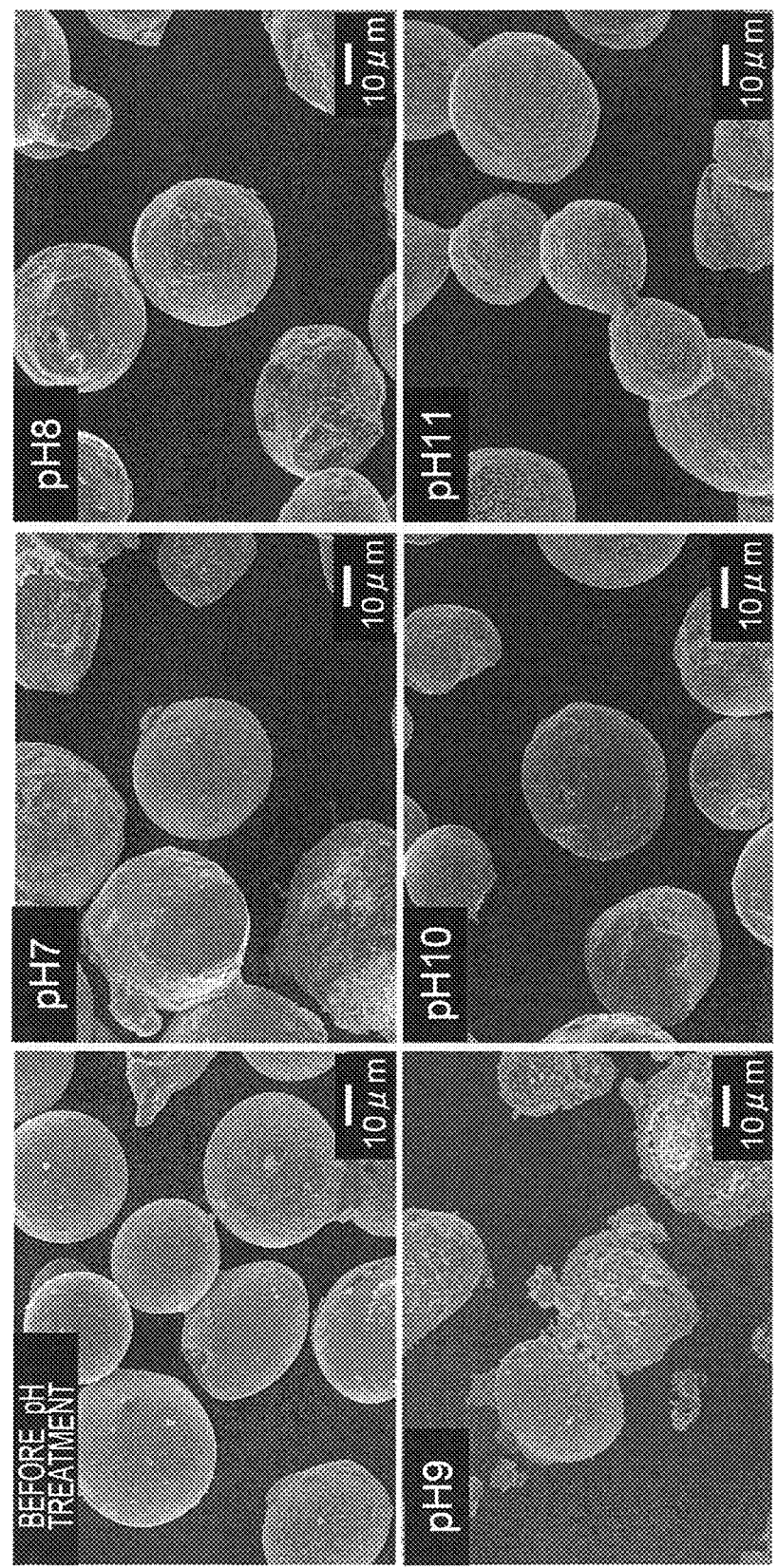
FIG. 26 is SEM photographs of surfaces of latent heat storage body microcapsules after stirring for 5 hours in a solution having a pH of 7 to 11.

FIG. 26 shows SEM photographs of surfaces of latent heat storage body microcapsules after being stirred at room temperature (25° C.) for 5 hours in a solution having a pH of 7, 8, 9, 10, and 11. When the treatment time was 3 hours or more, a honeycomb structure was observed on the surface of the microcapsule. It is considered that GaOOH which is a hydrate of Ga is formed around the Ga particles.

Shell Identification (XRD)

Figure 27:
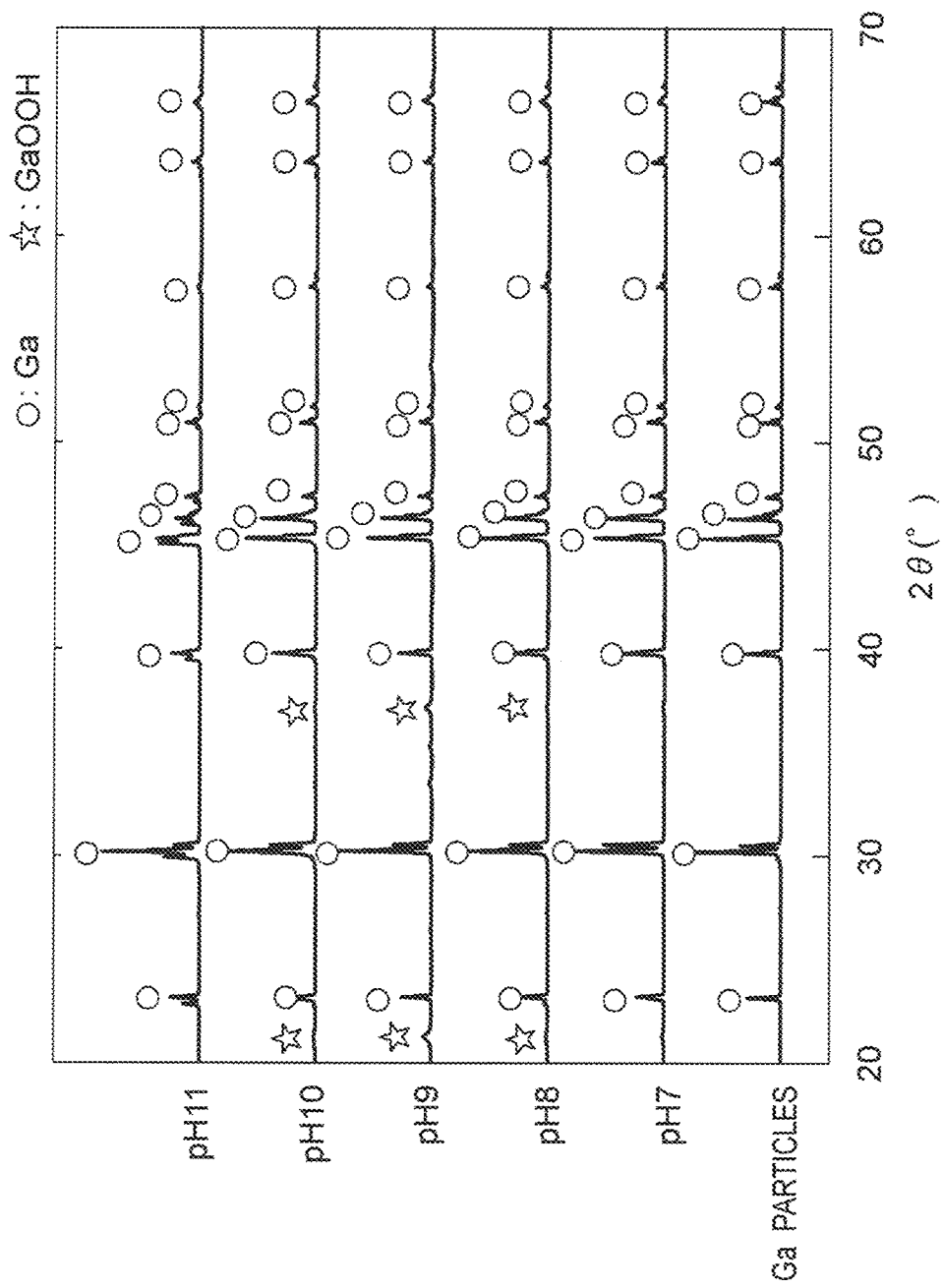
FIG. 27 shows results of X-ray diffraction performed on six samples of FIG. 26.

FIG. 27 shows the results of X-ray diffraction (XRD) performed on the six samples of FIG. 26. In the samples at pH 8, 9 and 10, GaOOH peaks were observed. This is from GaOOH which is a hydrate of Ga formed around Ga by

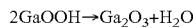

$Ga^{2+} + 2OH^- \rightarrow GaOOH + \tfrac{1}{2}H_2$. On the other hand, no peak of GaOOH was observed in the sample at pH 11. This is considered to be because, as described in "(2-2) Adjustment of Treatment Time", GaOOH is brought into an amorphous state at pH 11. In FIG. 27, the peak of GaOOH is the largest at pH 9.

Latent Heat Measurement (DSC)

Figure 28:
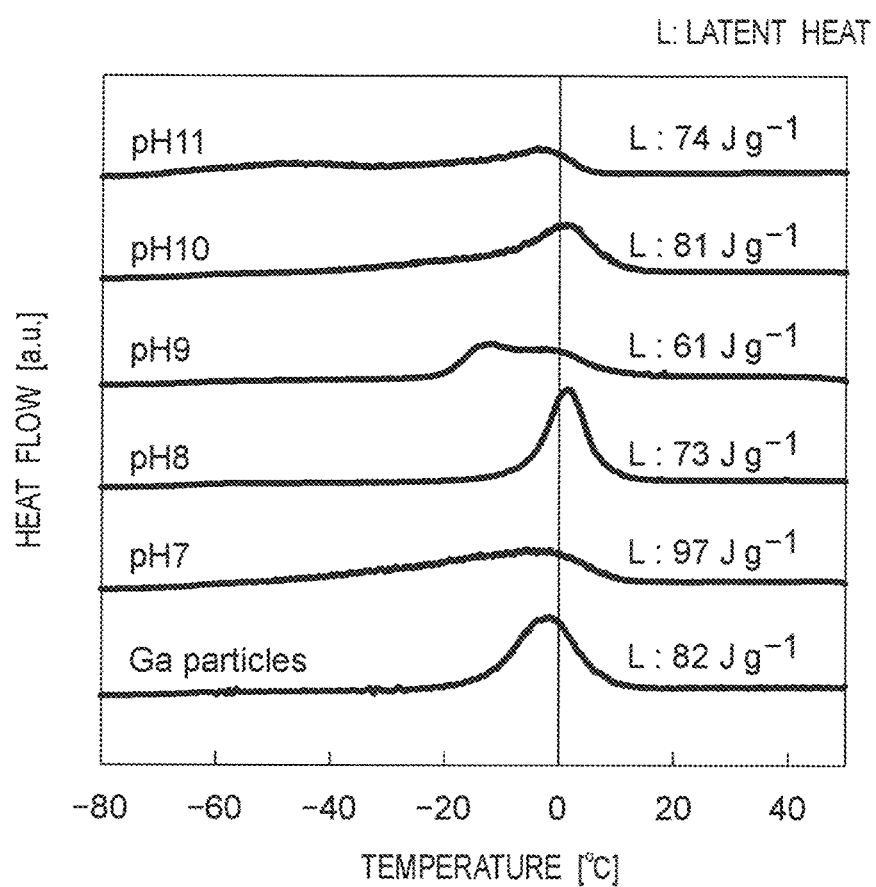
FIG. 28 shows results of differential scanning calorimetry of the latent heat for the six samples of FIG. 26.

FIG. 28 shows the results of differential scanning calorimetry (DSC) of latent heat for the six samples of FIG. 26. The measurement was performed by cooling from 50° C. to −80° C. at a cooling rate of 2° C./min. The atmosphere was an Ar atmosphere, and the Ar flow rate was 50 ml/min. While the latent heat amount of the Ga particles before the treatment was 82 J/g, the latent heat amounts were 97 J/g, 73 J/g, 61 J/g, 81 J/g, and 74 J/g at pH 7, 8, 9, 10, and 11, respectively.

It is considered that the latent heat amount at pH 9 is reduced because the film thickness of GaOOH as a shell is the largest.

Figure 29:
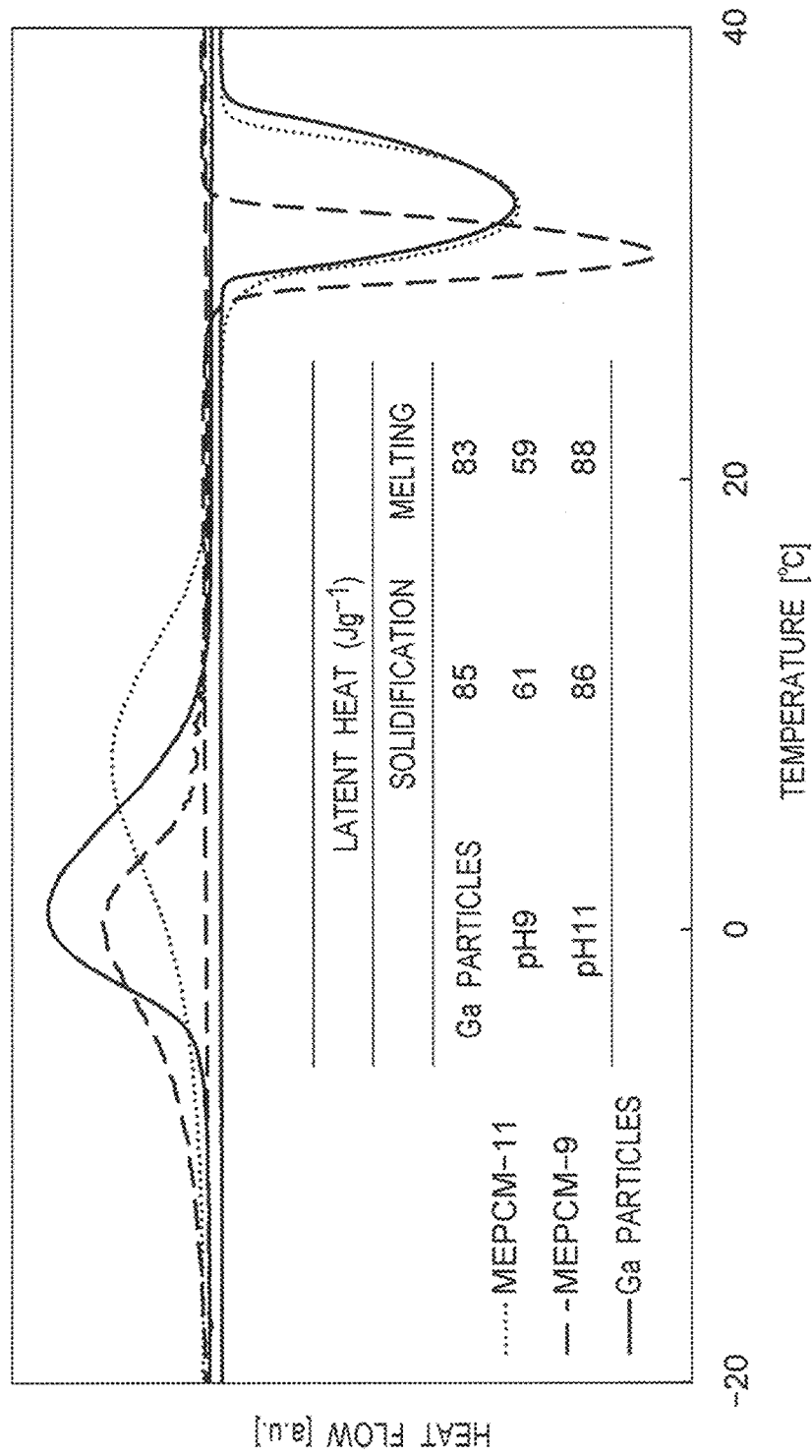
FIG. 29 shows results of differential scanning calorimetry of melting and solidification of the latent heat storage body microcapsules treated in solutions having pH 9 and pH 11 and Ga.

FIG. 29 shows results of differential scanning calorimetry of melting and solidification of the latent heat storage body microcapsules treated in solutions having pH 9 and pH 11 and Ga. The horizontal axis represents the temperature, the vertical axis represents the heat flow, and the measurement results of MEPCM-9 (pH 9), MEPCM-11 (pH 11), and Ga particle are shown. The latent heat in solidification was 85 J/g for pure Ga, 61 J/g for MEPCM-9, and 86 J/g for MEPCM-11. The latent heat in melting was 83 J/g for pure Ga, 59 J/g for MEPCM-9, and 88 J/g for MEPCM-11. It is found from the above that by treating in a solution of pH 11, a latent heat close to that of pure Ga is obtained as compared with the case of treating in a solution of pH 9.

Figure 30:
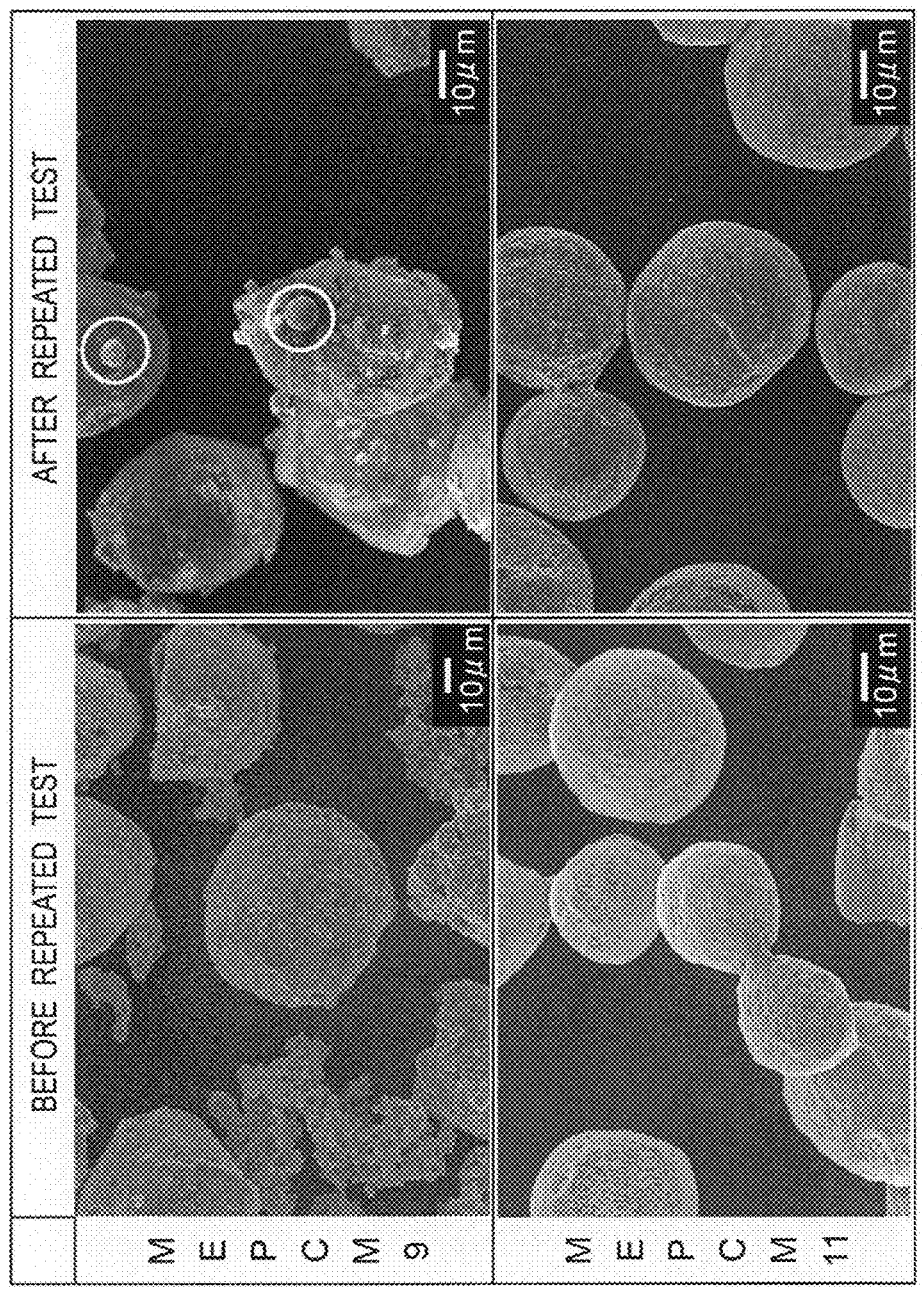
FIG. 30 is SEM photographs of surfaces of latent heat storage body microcapsules treated in solutions having pH 9 and pH 11 before and after a repeated test.

FIG. 30 shows surface SEM photographs of a sample before and after a repeated heat storage and release test (number of repetitions: 10) was performed on the MEPCM-9 (pH 9) and the MEPCM-11 (pH 11). In the MEPCM-9 (pH 9), after the repeated heat storage and release test, protrusions due to leakage of the Ga core were observed on the surface of the sample. On the other hand, in MEPCM-11 (pH 11), the spherical sample shape was maintained before and after the repeated heat storage and release test, and no protrusion was observed. As shown above, it is found that by optimizing the pH (pH 11) of the aqueous solution in the water treatment step, the shape of the sample is maintained even when heat is repeatedly stored and released, and favorable heat storage and release characteristics are obtained.

As described above, by adjusting the pH and treatment time of [3] pH treatment step, a favorable GaOOH shell can be formed around the gallium core in a solid state, and favorable heat storage and release characteristics can be obtained. The GaOOH may be in a honeycomb-shaped amorphous state.

INDUSTRIAL APPLICABILITY

The latent heat storage body microcapsule according to the present invention can be used as a heat storage material having a flexible shape in an electric vehicle or the like.

The invention claimed is:

1. A latent heat storage body microcapsule comprising:
   a core including gallium or gallium alloy; and
   a shell covering the core and including gallium oxide,
   wherein a volume inside the shell is 1.03 times or more of a volume of the core in a liquid state at a melting point temperature, and
   the shell has a thickness of from 0.5 to 1.0 μm.

2. The latent heat storage body microcapsule according to claim 1, wherein the gallium oxide includes $\beta\text{-Ga}_2\text{O}_3$ or mixture of $\alpha\text{-Ga}_2\text{O}_3$ and $\beta\text{-Ga}_2\text{O}_3$.

3. The latent heat storage body microcapsule according to claim 2, wherein a volume ratio of the $\beta\text{-Ga}_2\text{O}_3$ to the mixture-gallium oxide is 0.7 or more and 1 or less.

4. The latent heat storage body microcapsule according to claim 1, wherein the gallium alloy is a gallium-indium alloy, a gallium-tin alloy, or a gallium-zinc alloy.

5. The latent heat storage body microcapsule according to claim 1, wherein the latent heat storage body microcapsule has a particle size of 20 μm or more and 60 μm or less.

6. The latent heat storage body microcapsule according to claim 1, wherein a ratio (r2/r1) between a film thickness r2 of the shell and a radius r1 of the latent heat storage body microcapsule is 0.025 or more and 0.07 or less.

* * * * *